US010929768B2

(12) United States Patent
Al Kalaa et al.

(10) Patent No.: US 10,929,768 B2
(45) Date of Patent: Feb. 23, 2021

(54) PROBABILISTIC EFFICIENT STORAGE ALGORITHM FOR TIME-DOMAIN SPECTRUM MEASUREMENTS

(71) Applicant: The United States of America, as represented by the Secretary, Department of Health and Human Services, Silver Spring, MD (US)

(72) Inventors: Mohamad Omar Al Kalaa, Silver Spring, MD (US); Seth J. Seidman, Silver Spring, MD (US)

(73) Assignee: The United States of America, as represented by the Secretary, Department of Health and Human Services, Silver Spring, MD (US)

( * ) Notice: Subject to any disclaimer, the term of this patent is extended or adjusted under 35 U.S.C. 154(b) by 0 days.

(21) Appl. No.: 16/391,135

(22) Filed: Apr. 22, 2019

(65) Prior Publication Data
US 2020/0334558 A1 Oct. 22, 2020

(51) Int. Cl.
*H04W 16/14* (2009.01)
*G06N 7/00* (2006.01)
*G06F 1/3209* (2019.01)
*H04L 5/00* (2006.01)
*G06F 1/3296* (2019.01)

(52) U.S. Cl.
CPC .......... *G06N 7/005* (2013.01); *G06F 1/3209* (2013.01); *G06F 1/3296* (2013.01); *H04L 5/0005* (2013.01); *H04W 16/14* (2013.01)

(58) Field of Classification Search
CPC ..... H04W 16/14; H04L 5/0005; G06N 7/005; G06F 1/3209; G06F 1/3296
See application file for complete search history.

(56) References Cited

U.S. PATENT DOCUMENTS

2012/0113866 A1* 5/2012 Tenny ................... H04W 24/10
370/254
2015/0221310 A1* 8/2015 Abe ........................ G10L 19/02
704/500
2018/0331871 A1* 11/2018 Martinez ............. H04W 88/085

OTHER PUBLICATIONS

Al Kalaa et al., "Characterizing the 2.4 GHz Spectrum in a Hospital Environment: Modeling and Applicability to Coexistence Testing of Medical Devices," *IEEE Transactions on Electromagnetic Compatibility*, 59(1):58-66 (Feb. 2018).
(Continued)

*Primary Examiner* — Wei Zhao
(74) *Attorney, Agent, or Firm* — Klarquist Sparkman, LLP

(57) ABSTRACT

Methods include compressing a plurality of time domain samples with a processor and memory by providing the plurality time domain samples and a plurality of power bins, identifying an activity window corresponding to a sequence of the time domain samples that are above a selected power threshold, determining a power average for the activity window, assigning the power average to one of the power bins having a range that includes the power average, and storing the assigned power bin and number of time domain samples of the activity window. Related decompression methods that can estimate a radio frequency power over time from the compressed power window data, as well as systems employing compression and/or decompression methods are also disclosed. Selected examples employ Gaussian mixture models and Bayesian responsibility functions.

20 Claims, 13 Drawing Sheets

(56) References Cited

OTHER PUBLICATIONS

Al Kalaa et al., "Estimating the Likelihood of Wireless Coexistence Using Logistic Regression: Emphasis on Medical Devices," *IEEE Transactions on Electromagnetic Compatibility*, 60(5):1546-1554 (Oct. 2018).

Al Kalaa et al., "Monitoring Radiated Coexistence Testing Using GMM-Based Classifier," *IEEE Transactions on Vehicular Technology*, 66(11):10336-10345 (Nov. 2017).

Al Kalaa et al., "PESA: Probabilistic Efficient Storage Algorithm for Time-Domain Spectrum Measurements," *IEEE Transactions on Instrumentation and Measurement*, 9 pages (Aug. 2018).

"American National Standard for Evaluation of Wireless Coexistence," *IEEE Standards Association*, 77 pages (May 11, 2017).

Attard et al., "A High-performance Tiered Storage System for a Global Spectrum Observatory Network," *2014 $9^{th}$ International Conference on Cognitive Radio Oriented Wireless Networks (CROWNCOM)*, pp. 466-473 (Jan. 1, 2014).

Balid et al., "Development of Measurement Techniques and Tools for Coexistence Testing of Wireless Medical Devices," *Workshop on Smart Spectrum (IWSS 2016)*, 6 pages (Apr. 2016).

Bland et al., "Statistical methods for assessing agreement between two methods of clinical measurement," *International Journal of Nursing Studies*, 47(8):931-936 (Aug. 2010).

Carroll et al., Case Study: Investigation of Interference into 5 GHz Weather Radars from Unlicensed National Information Infrastructure Devices, Part III, *U.S Department of Commerce*, 46 pages (Jun. 2012).

Deutsch, (DEFLATE Compressed Data Format Specification version 1.3,) *Aladdin Enterprises*, 15 pages (Apr. 1996).

"Evolved Universal Terrestrial Radio Access (E-UTRA); Base Station (BS) radio transmission and reception (3GPP TS 36.104 version 14.3.0 Release 14)," *ETSI Technical Specification*, 220 pages (Apr. 13, 2017).

Ferreira et al., "Solution for Spectrum Monitoring of the Industrial, Scientific and Medical (ISM) Radio Bands," *2015 Latin American Network Operations and Management Symposium* (LANOMS), 7 pages (Oct. 1-3, 2015).

Ghanem, "IEEE 802.11 AC Performance Analysis and Measurement Tools," *A Thesis Approved for the School of Electrical and Computer Engineering*, 62 pages (Aug. 2018).

Höyhtyä et al., "Spectrum Occupancy Measurements: A Survey and Use of Interference Maps," *IEEE Communications Surveys & Tutorials*, 18(4):2386-2414 (Fourth Quarter 2016).

Huang et al., "Beyond Co-existence: Exploiting WiFi White Space for ZigBee Performance Assurance," *The $18^{th}$ IEEE International Conference on Network Protocols*, pp. 305-314 (Oct. 5-8, 2010).

Huang et al., "Recent Advances of LTE/WiFi Coexistence in Unlicensed Spectrum," *IEEE Network*, pp. 107-113 (Mar./Apr. 2018).

López-Benítez et al., "Methodological Aspects of Spectrum Occupancy Evaluation in the Context of Cognitive Radio," *European Wireless 2009*, pp. 199-204 (Nov. 5, 2010).

NI PXIe-5644R, http://www.ni.com Support, 2 pages (2019).

Noorts et al., "Spectrum Observatory Database based on a Hybrid Storage System," *IEEE International Symposium on Dynamic Spectrum Access Networks*, pp. 114-120 (2012).

"Part II: Wireless LAN Medium Access Control (MAC) and Physical Layer (PHY) Specifications," *IEEE Standards Association*, pp. 183-245 (2016).

Rajab et al., "Toward enhanced wireless coexistence in ISM band via temporal characterization and modelling of 802.11b/g/n networks," *Wireless Communications and Mobile Computing*, 16:3212-3229 (Nov. 3, 2016).

Rajandekar, et al., "On the Feasibility of Using WiFi White Spaces for Opportunistic M2M Communications," *IEEE Wireless Communications Letters*, 4(6):681-684 (Dec. 2015).

"Spectrum occupancy measurements and evaluation," *International Telecommunication Union, Report ITU-R SM.2256.1*, 53 pages (Aug. 2016).

Taher et al., "Long-term Spectral Occupancy Findings in Chicago," *2011 IEEE International Symposium on dynamic Spectrum Access Networks (DySPAN)*, pp. 100-107 (May 3-6, 2011).

Uno et al., "A Proposal of QoE Based Self-Organized Wireless System Considering the Measurement Results in a Major Hospital," *$9^{th}$ International Workshop on Wireless Network Measurements 2013*, pp. 101-106 (May 13, 2013).

Yarkan, "A Generic Measurement Setup for Implementation and Performance Evaluation of Spectrum Sensing Techniques: Indoor Environments," *IEEE Transactions on Instrumentation and Measurement*, 64(3):606-614 (Mar. 2015).

\* cited by examiner (a) Active periods

PROBABILISTIC EFFICIENT STORAGE ALGORITHM FOR TIME-DOMAIN SPECTRUM MEASUREMENTS

FIELD

The field is time-domain measurements, compression, decompression, and storage.

BACKGROUND

Wireless technology can facilitate innovative applications in medical devices and other equipment. However, susceptibility to interference can present obstacles, particularly in unlicensed frequency bands where users must share spectrum resources to achieve wireless coexistence. Analysis of spectrum measurements can prove difficult with the substantial amount of data to be retained for analysis. Accordingly, a need remains for improvements in the area of data storage and analysis.

SUMMARY

Methods and apparatus are disclosed for probabilistic compression and/or decompression of time domain power samples.

According to an aspect of the disclosed technology, methods include compressing a plurality of time domain samples with a processor and memory by providing the plurality time domain samples and a plurality of power bins, identifying an activity window corresponding to a sequence of the time domain samples that are above a selected power threshold, determining a power average for the activity window, assigning the power average to one of the power bins having a range that includes the power average, and storing the assigned power bin and number of time domain samples of the activity window. Some examples include splitting a dynamic range of a monitoring device into a plurality of ranges corresponding to the power bins and respectively assigning a model component to each power bin, wherein the model components comprise Gaussian components of a Gaussian mixture model, and wherein the range that includes the power average corresponds to the range of the power bin having a largest Bayesian responsibility for the power average. Selected examples include determining the largest Bayesian responsibility for the power average by determining an argmax of a Bayesian responsibility function. Some examples include detecting the plurality of time domain samples of radio frequency power with the monitoring device. In some examples, the monitoring device is a spectrum analyzer, a software defined radio, or a probabilistic compression and storage device. In additional examples, the compressing the plurality of time domain samples includes identifying additional activity windows, for each additional activity window, determining an additional power average and assigning the additional power average to one of the power bins having a range that includes the additional power average, and storing the additional assigned power bin and activity window data. In some embodiments, the assigning the additional power average is based on the largest respective Bayesian responsibility for the additional power average. Some examples include estimating a prior radio frequency power over time based on the stored assigned power bin and number of time domain samples of the activity window. In some estimation examples, the estimating includes, for the activity window, sequentially drawing random samples from a Gaussian distribution having a mean and standard deviation corresponding to a mean and standard deviation of the model component associated with the assigned power bin of the activity window. According to some examples, the estimation corresponds to a wireless transmission channel usage. In some examples, the model components comprise a Gaussian mixture model and the Gaussian mixture model further comprises a noise power bin. In some examples, the noise power bin has a noise power mean and the selected power threshold is a predetermined amount greater than the noise power mean. Representative examples can include identifying an inactivity window corresponding to a plurality of time domain samples below the selected power threshold. In some examples, each power bin has a power observation bin width defining, for the respective model component, a Gaussian component of a Gaussian mixture model with the Gaussian component having a mean at a center of the bin width and a standard deviation equal to the bin width. According to some embodiments, the time domain samples correspond to a specific frequency band over a selected observation period. In some examples, the time domain samples include to sampling over multiple frequency bands over a selected observation period. In representative examples, the compressed plurality of time domain samples comprises a plurality of activity windows and inactivity windows.

According to another aspect of the disclosed technology, methods include selecting stored compressed power window data comprising an activity window identifier and a power bin reference and window length associated with the activity window identifier, wherein the power bin reference designates one of a plurality of power bins that split a dynamic range of a monitoring device, with each power bin associated with a reconstruction model component, and estimating a radio frequency power over time from the selected compressed power window data based on the power bin reference and the window length. In some examples, the estimating includes sequentially drawing random samples from a Gaussian distribution having a mean and standard deviation corresponding to a mean and standard deviation of the reconstruction model component associated with the power bin designated by the power bin reference. In selected examples, the estimating includes adding the sequentially drawn random samples to sequentially drawn random noise samples. According to representative examples, the power window data comprises a plurality of activity window identifiers, each having a respective power bin reference and window length, wherein the reconstruction model components are Gaussian components of a Gaussian mixture model having respective means at centers of bin widths of the power bins and respective standard deviations equal to the bin widths. In some embodiments, the radio frequency power over time includes lengths of inactivity and lengths of activity.

According to a further aspect of the disclosed technology, apparatus include a processor, and a memory having stored computer-executable instructions which, when executed by the processor, cause the apparatus to compress a plurality of time domain samples by splitting a dynamic range associated with the plurality of time domain samples into a plurality of power bins and respectively assigning a Gaussian component of a Gaussian mixture model to each power bin, identifying an activity window corresponding to a sequence of the time domain samples that are above a selected power threshold, determining a power average for the activity window, assigning the power average to one of the power bins having a range that includes the power average, and storing the assigned power bin and number of time domain samples of the activity window. In some examples, the power bin having the range that includes the power average corresponds to the power bin having a largest Bayesian responsibility for the power average. Some examples further include a detector with the dynamic range, coupled to the processor and configured to detect the time domain samples.

According to another aspect of the disclosed technology, apparatus include a processor, and a memory having stored computer-executable instructions which, when executed by the processor, cause the apparatus to provide a signal estimate for a plurality of time domain samples by selecting stored compressed power window data comprising an activity window identifier and a power bin reference and window length associated with the activity window identifier, wherein the power bin reference designates one of a plurality of power bins that split a dynamic range of a monitoring device, with each power bin associated with a Gaussian component of a Gaussian mixture model, and estimating a radio frequency power over time from the selected compressed power window data based on the power bin reference and the window length. In some examples, the estimating includes sequentially drawing random samples from a Gaussian distribution having a mean and standard deviation corresponding to a mean and standard deviation of the Gaussian component associated with the power bin designated by the power bin reference.

A further aspect of the disclosed technology includes a non-transitory computer-readable storage medium storing processor-executable instructions that cause a device to compress a plurality of time domain samples, the instructions operable to split a dynamic range of a monitoring device into a plurality of power bins and respectively assigning a Gaussian component of a Gaussian mixture model to each power bin, identify an activity window corresponding to a sequence of the time domain samples that are above a selected power threshold, determine a power average for the activity window, assign the power average to one of the power bins having a range that includes the power average, and cause the assigned power bin and number of time domain samples of the activity window to become stored. In some examples, the power bin having the range that includes the power average corresponds to the power bin having a largest Bayesian responsibility for the power average.

Another aspect of the disclosed technology includes a non-transitory computer-readable storage medium storing processor-executable instructions that cause a device to provide decompression of a plurality of compressed time domain samples, the instructions operable to select stored compressed power window data comprising an activity window identifier and a power bin reference and window length associated with the activity window identifier, wherein the power bin reference designates one of a plurality of power bins that split a dynamic range of a monitoring device, with each power bin associated with a Gaussian component of a Gaussian mixture model, and estimate a radio frequency power over time from the selected compressed power window data based on the power bin reference and window length.

The foregoing and other objects, features, and advantages of the disclosed technology will become more apparent from the following detailed description, which proceeds with reference to the accompanying figures.

DETAILED DESCRIPTION

Figure 1:
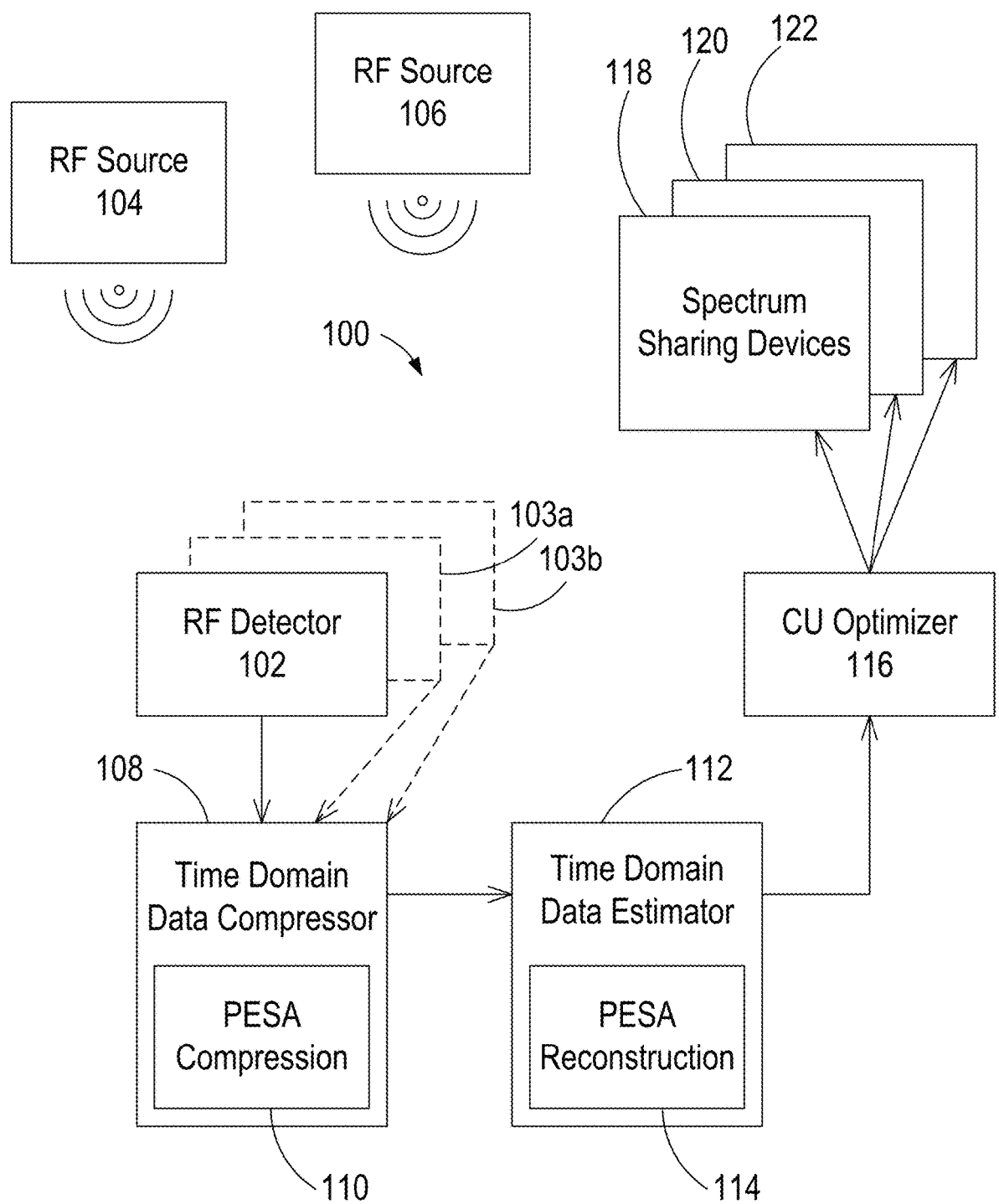
FIG. 1 is a schematic of a spectrum survey and compression/decompression system using an example probabilistic efficient storage algorithm (PESA).

Wireless communication is becoming an essential part of daily life for users globally with applications in medical devices, cellular phones, Internet of Things nodes, and others. The patterns and properties of radio frequency spectrum use can be acquired or investigated through accurate spectrum utilization measurements. However, the massive storage volume needed to execute spectrum surveys—especially when a fast sampling rate is used—is an impeding factor in terms of cost and ease-of-access.

Probabilistic efficient storage algorithms (PESA) are disclosed that can be of low complexity and that can facilitate the storage and analysis of time-domain spectrum measurements. For example, the present disclosure relates to the article entitled "PESA: Probabilistic Efficient Storage Algorithm for Time-Domain Spectrum Measurements," by Al Kalaa et al., *IEEE Transactions on Instrumentation and Measurement*, 9 pages (August 2018), which is incorporated by reference herein in its entirety. In particular, examples can allow time domain spectrum surveys conducted at a fast sample acquisition rate to detect sporadic spectrum occupancy patterns that could be on the order of microseconds. In representative examples, the dynamic range of monitoring equipment (ME) is split into bins and mapped to a model, such as a Gaussian mixture model (GMM), activity/inactivity measurements are taken (establishing windows by comparing with a threshold), and references to the Gaussian components of the GMM best describing each window of the activity/inactivity measurements and the length of the corresponding window are recorded. In some examples, the resulting stored compressed data can achieve ≈99% reduction in storage volume while maintaining an accurate estimation of channel utilization and activity/inactivity periods.

Gaining an understanding of the patterns and properties of radio frequency spectrum use, particularly in unlicensed frequency bands where users typically must share spectrum resources to achieve wireless coexistence, can provide insights into the susceptibility of wirelessly communicating devices to radio-frequency interference and ways to mitigate such interference. Accordingly, spectrum measurements can serve investigative and verification purposes. The former can include documenting the wireless environment prior to (or after) the deployment of a new wireless system, analyzing sources of interference to the primary user of the frequency band, and the mutual interaction between coexisting users. The latter includes verifying the conformity of a device transmissions to standard requirements, and studying the implementation of medium access control (MAC) protocols like the case of coexisting Wi-Fi and unlicensed LTE technologies with heterogeneous channel access mechanisms. Monitoring equipment (ME), such as spectrum analyzers and software defined radios (SDR), are used to acquire and record observed power values, typically at a receiving antenna of the ME. When ME is set to operate in the frequency domain, a wide range of frequencies are swept and signal power measurements are recorded per frequency bin (i.e., resolution bandwidth "RBW"). This is useful to detect persistent signals and emissions in neighboring bands. However, time-domain (i.e., zero-span) measurements are typically required to observe fast signal variations. In such time-domain measurement examples, the ME local oscillator is typically fixed on a narrow bandwidth allowing for fast sample acquisition—thus avoiding under-sampling.

Spectrum sensing is often a key enabler of applications such as cognitive radio and unlicensed spectrum technologies (e.g., Wi-Fi, ZigBee, unlicensed LTE, etc.). Information about the distributions of active and inactive periods of usage can be used to inform or enable spectrum sharing mechanisms for such applications. Furthermore, spectrum measurements—in the form of a targeted survey of an environment—can be used to complement the testing data of a wireless device. For example, when a device is tested for wireless coexistence using the American National Standards Institute (ANSI) C63.27 standard for evaluation of wireless coexistence, the outcome is a detailed description of the expected device performance under various coexistence scenarios (e.g., channel allocation, channel utilization, and transmission power of coexisting systems). However, to estimate the device performance in an intended use environment, testing results should be accompanied by—and integrated with information about the environment realized through a spectrum survey. In this regard, it can be important to capture accurate environment spectrum measurements for use in the analysis. Accuracy can be enhanced by increasing the sampling rate. Notably, wireless communication protocols such as the IEEE 802.11 family of standards exhibit channel activities on the scale of microseconds. Therefore, time-domain measurements can permit capturing the fast changes in active/inactive status of the channel and allow accurate evaluation of wireless coexistence of contending transmitters.

The output of spectrum surveys is typically a dataset that contains power samples detailing the observed received power (P) at the ME antenna for a specific frequency band during an observation period. The received radio frequency (RF) signal is down-converted and sampled into high-speed I/Q data streams that can be leveraged to calculate P and then the result is recorded on a storage medium with a predefined numerical accuracy. One solution to avoid storing massive volumes of coarse power samples is to transform the measurements into a representative metric like channel utilization (CU) defined as the fraction of time during which the spectrum is detected as busy (i.e., the observed power exceeds a threshold). However, this comes at the expense of losing a part of the information embedded in the dataset like the distributions of channel active and inactive periods (i.e., white spaces), and curbs further discovery of potential insights into the raw measurements.

With reference to FIG. 1, in some examples of the disclosed technology herein, probabilistic efficient storage algorithms (PESA), typically of low complexity, can be used to facilitate the storage and analysis of time-domain spectrum measurements and to remedy fidelity losses in CU metrics. For example, a spectrum survey system 100 includes an RF detector 102 (e.g., that might be included in a monitoring device or with monitoring equipment) situated to detect RF signals generated by RF sources 104, 106 and produce time domain measurements corresponding to the detected RF signals. The RF detector 102 is coupled to a time domain data compressor 108 configured to process and compress the time domain measurements using a PESA storage algorithm 110, and to store the compressed values associated with the time domain measurements. A time domain estimator 112 (which can be part of or separate from the time domain data compressor 108) is configured to produce a reconstruction estimate of the time domain signal defined by the time domain measurements with a PESA reconstruction algorithm 114. A channel utilization optimizer 116 can use the reconstruction estimate (or the compressed values more directly) to determine spectrum allocation or other spectrum usage optimizations that reduce interference or signal competition for spectrum sharing devices 118, 120, 122. In some examples, spectrum surveys and CU determinations can be enhanced by including additional RF detectors 103*a*, 103*b* located at different positions in the environment. Examples of the channel utilization optimizer 116 can include separate devices having processors and memory or devices that can also perform compression and/or decompression of time domain samples. Example systems and methods configured to optimize coexistence based on spectrum use data are disclosed in Rajab et al., "Toward enhanced wireless coexistence in ISM band via temporal characterization and modelling of 802.11b/g/n networks," Wireless Communications and Mobile Computing, Volume 16, Issue 18, published Nov. 3, 2016 (herein incorporated by reference).

As will be discussed further below, such storage improvements can be achieved in representative examples by mapping the ME dynamic range (such as for the RF detector 102) to a Gaussian mixture model (GMM) and then recording references to the GMM components for each window of measurements activity/inactivity in addition to the length of the corresponding window. Examples herein can be analogous in some ways to lossless compression algorithms that use a dictionary to store the frequency of patterns of bits, where this information—accompanied by the dictionary—can be used to recreate the source data. However, instead of bit patterns, PESA stores the number of samples and the GMM component responsible for a given window of activity/inactivity. In typical examples, the length of this window varies following the realistic spectrum observations. Representative PESA storage compression and reconstruction algorithms can maintain high quality estimation of CU, maintain signal temporal characteristics in terms of activity and inactivity periods, and significantly reduce storage volume of collected data. Selected examples discussed below verified these advantages through a validation campaign comprising a wide range of CU values in a lab setup. Furthermore, some PESA examples were implemented in LabVIEW systems engineering software and executed on a hardware platform to conduct a short-term, time-domain spectrum survey in a healthcare facility. Results show that PESA examples can achieves ≈99% reduction in required storage volume while successfully accomplishing its design objectives.

Related Work in Spectrum Surveys

Spectrum surveys can facilitate spectrum sharing, coexistence management, and policy development. A spectrum survey is typically performed for a specific frequency band, geographical location, and period of time. Spectrum surveys that are conducted over a long—or indefinite—period of time typically produce a large volume of data, which would introduce the need to reduce the amount of data and condense it into meaningful and compact information. For example, in 2007 the wireless network and communications (WiNCom) research center at the Illinois Institute of Technology initiated a continuous RF spectrum measurement program in the frequency range 30 MHz to 6 GHz. On average, 100 gigabytes of spectrum measurements are generated monthly, requiring terabytes of storage volume during more than three years. In another example, a spectrum survey was conducted in a hospital environment in Oklahoma City, Okla. Approximately 6.5 terabytes of data were collected during an 84-day period. The survey was conducted in the frequency-domain for the 2.4 GHz industrial, scientific, and medical (ISM) band and relied on a supercomputer for data storage and processing.

Data storage and retrieval are some of the major challenges burdening the acquisition of spectrum measurements at a higher rate and diverse locations. Big data techniques and high-performance computing can be used but these techniques and apparatus require sophisticated infrastructure (e.g., cloud computing, graphical processing units (GPU), etc.). Other approaches have been proposed, such as (i) the use of hierarchical data format HDFS for data storage, (ii) data storage systems evaluated based on Hadoop framework and MongoDB as an indexing database for the actual spectrum measurement data, (iii) elaborate measurement storage and database architecture used in international spectrum observatories for long-term continuously running surveys including a storage methodology labeled Tiered Storage of Generic Spectral Data (TSGSD), which uses a database for measurement metadata, Cleversafe dsNet Simple Object Storage for measurement storage, and a caching layer for optimal retrieval speeds, to deal with massive data volumes, and (iv) measurement storage in a SQL database with indicators of time, frequency and power level observed on each frequency bin in an example infrastructure for spectral analysis of unlicensed bands.

In other areas, data compression is a widely investigated field that yielded popular general purpose lossless algorithms—typically capable of maintaining the source data upon decompression. Examples of lossless methods include the DEFLATE algorithm on which ZIP archives are based and the Lempel-Ziv-Markov chain algorithm (LZMA) algorithm, which is the basis of 7z archives. Also, lossy application-specific algorithms—permitting small changes in the source data to facilitate increased compression ratios—are widely used in the domains of image, audio, and video storage. However, there has been a lack of methods reported that are tailored for reducing the storage volume of spectrum measurements, or related attempts to generate methods have met with failure. While other spectrum measurement contributions focus on establishing database systems to facilitate data storage and access, representative examples herein transform spectrum measurements into a new form that can maintain embedded information therein. Different from popular lossless data compression techniques, examples of the disclosed technology can take advantage of the idiosyncrasies of wireless activity observed in realistic channels, thereby facilitating the execution of spectrum surveys and also off-line post processing. Lossless compression can be used to reduce the storage volume of spectrum measurements—and of PESA outputs if desired. However, this can also add the burden of additional compression/decompression to the processing flow. Furthermore, as shown below, representative PESA examples can significantly outperform several lossless compression methods.

GMM probabilistic modeling has been successfully implemented to distinguish CU of multiple coexisting wireless systems. Unlike PESA where GMM captures granular divisions of the ME dynamic range, the GMM model distinguishing CU of multiple coexisting wireless systems was established through a training step focusing on the signal levels of coexisting systems known a priori. In accordance with various examples herein, PESA compression and decompression can be implemented and integrated efficiently within various spectrum observatory architectures such as the ones mentioned hereinabove.

Compression and Estimation Examples

Figure 2A:
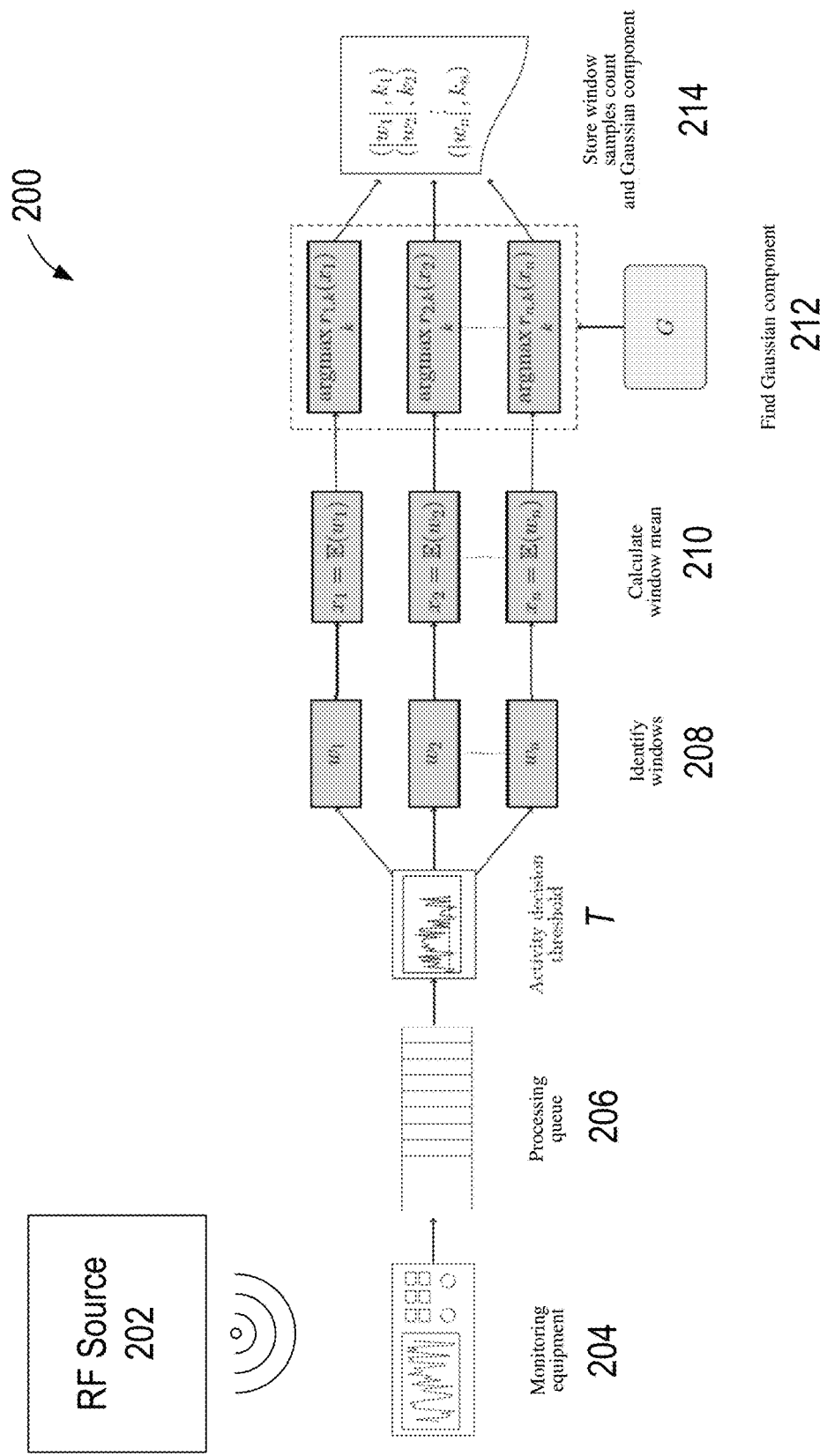
FIG. 2A is a PESA system diagram detailing the process flow that starts by sample acquisition using ME and ends by textual data.
Figure 2B:
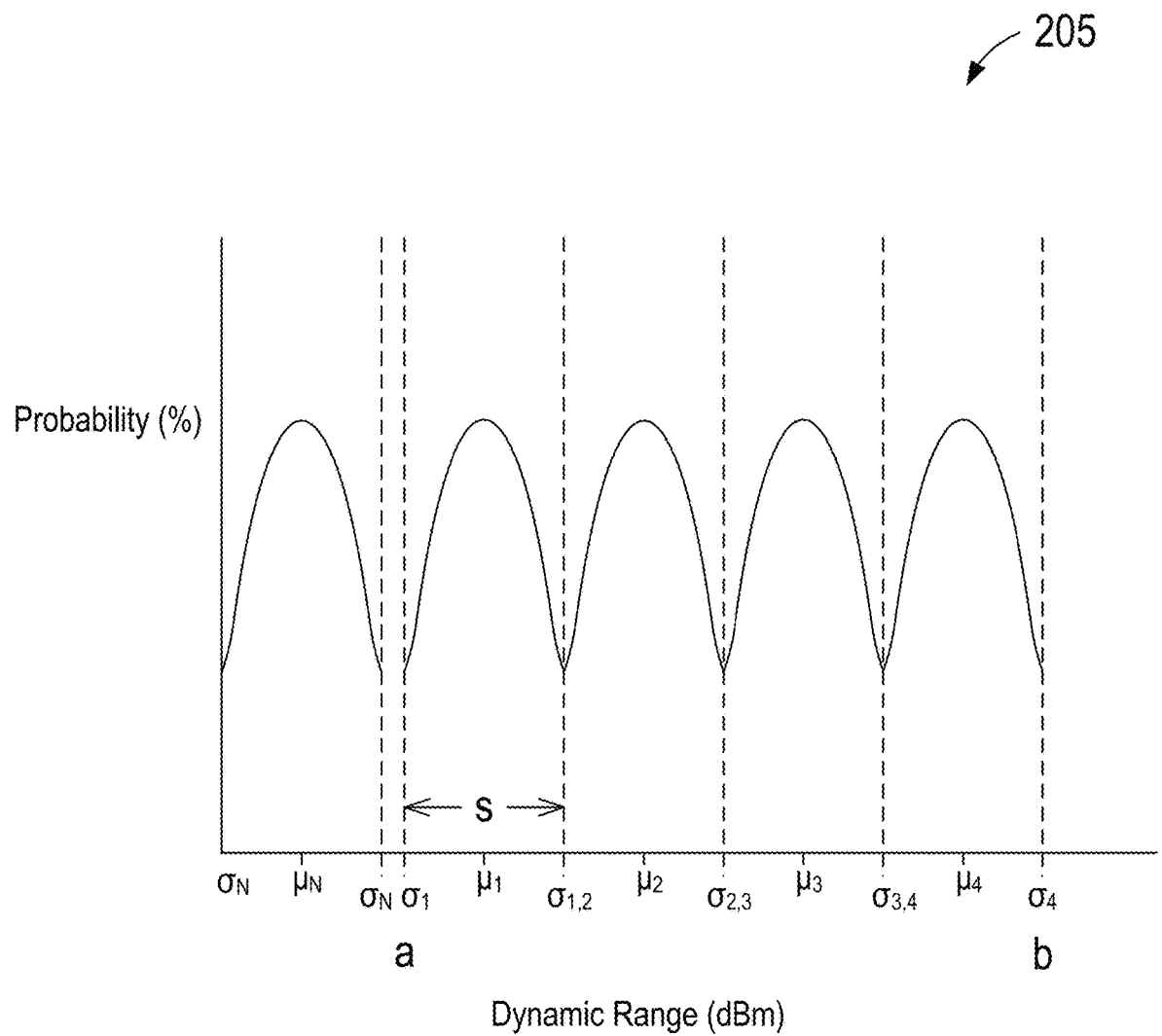
FIG. 2B is a graph of an example GMM component bin arrangement.
Figure 2C:
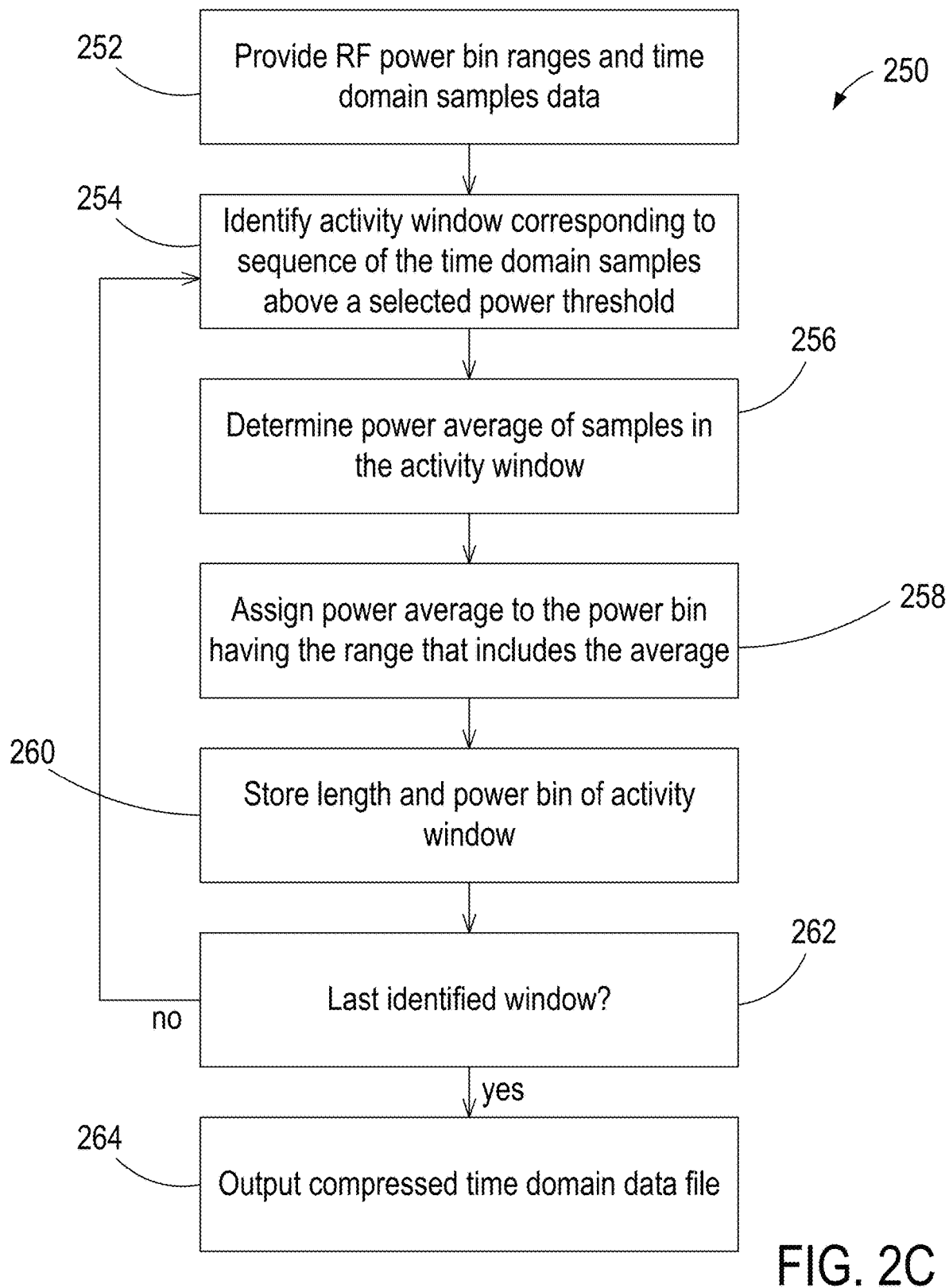
FIG. 2C is a flowchart of a compression method using PESA.

FIGS. 2A-2C shows a system 200 configured to implement PESA algorithm, and a related data compression method 250. An RF source 202, such as a wideband transmitter, can simultaneously occupy most of its operational bandwidth upon transmission (e.g., Wi-Fi and LTE licensed assisted access). Consequently, using time-domain measurements to monitor a center frequency within a Wi-Fi channel of 20 MHz bandwidth can provide sufficient information to accurately infer the temporal channel utilization—defined as the fraction of time a wireless channel is detected to be busy within an integration time. Let the channel status at any moment of observation i be $X_i$, where $X_i=1$ when the channel is busy and $X_i=0$ when the channel is idle. Let p be the actual channel utilization (i.e., the actual fraction of time that the channel is busy), $q=1-p$, and $S_n=X_1+X_2+\ldots+X_n$, where n is the number of acquired samples in an integration time. Estimating p is done by calculating $$\bar{p} = \Phi = \frac{S_n}{n}.$$

Per the central limit theorem, $\Phi$ is normally distributed and the 95% confidence interval for the estimate is $$\left(\Phi - \frac{2\sqrt{pq}}{\sqrt{n}}, \Phi + \frac{2\sqrt{pq}}{\sqrt{n}}\right) \qquad (1)$$

It can be shown that $\overline{pq} \leq \frac{1}{4}$. Therefore, the length of the confidence interval $$L \leq \frac{2}{\sqrt{n}}.$$

Time-domain spectrum measurements allow for fast sample acquisition (i.e., large n), which contributes to accurate Φ estimates. For example, a total of $1 \times 10^6$ samples in an integration time leads to $L \leq 0.2\%$. If frequency-domain measurements are performed to sweep the frequency band of interest with a revisit time of 1 ms, the length of the confidence interval increases to $L \leq 6.32\%$.

PESA examples can be constructed based on the observation that wireless transmissions in unlicensed bands are often executed in a discontinuous fashion (i.e., periods of activity separated by periods of inactivity, where only noise samples can be observed). This is especially significant where channel access is shared among coexisting users using listen-before-talk (LBT) mechanism employed by technologies like Wi-Fi, LAA, and ZigBee in the 2.4 GHz and 5 GHz ISM bands. From the perspective of a ME 204, frame transmission by the RF source 202 (such as a single RF source) is observed at a relatively constant power level following the separation distance between the transmitter and the ME, and the transmission power used by the transmitter of the RF source 202. To implement a PESA example, the dynamic range of the ME 204 can be divided or split into bins that are represented by a mixture of Gaussians G (e.g., corresponding to a GMM).

$$G = \frac{1}{M+1}\left[\sum_{i=0}^{M-1} \mathcal{N}(a + i \times s, s) + \mathcal{N}(\mu_N, \sigma_N)\right] \quad (2)$$

where $$\mathcal{N}(\mu, \sigma) = \mathcal{N}(x \mid \mu, \sigma) = \frac{1}{\sigma\sqrt{2\pi}} \exp -\frac{1}{2}\left(\frac{x-\mu}{\sigma}\right)^2$$

is a Gaussian distribution with mean μ and standard deviation σ; s is the power observation bin width; $\mu_N$, $\sigma_N$ are the mean and standard deviation of the noise measurements, respectively; M is the total number of observation bins excluding that of the noise. The Gaussian component representing the noise samples can be added separately because the mean and standard deviation of the noise can be estimated a priori by distribution fitting of independently observed noise samples. Consequently, the total number of components in G is M+1. M is given by $$M = \begin{cases} \left\lceil \frac{b-a}{s} \right\rceil + 1 & \text{if } \mathrm{mod}\left(\frac{b-a}{s}, 1\right) = 0 \\ \left\lceil \frac{b-a}{s} \right\rceil & \text{otherwise} \end{cases} \quad (3)$$

where a, b are the lower and upper limits of ME dynamic range, respectively; $\lceil x \rceil$ is the least integer greater than or equal to x. FIG. 2B shows a graph 205 of an example of the system 200 where M=4. FIG. 2A details a PESA system diagram where the ME 204 is tuned to a frequency of interest and collects over-the-air power measurements at a given I/Q sampling rate. Collected measurements are inserted into a first-in-first-out (FIFO) processing queue 206 in which a cell corresponds to a target integration time (e.g., 1 s). Activity and inactivity windows 208 are established by comparing power measurements with an activity decision threshold T that can be determined based on the noise mean. All measurements exceeding T are indicated by 1's while those at or below the threshold are indicated by 0's. Each of the activity (inactivity) windows 208 is a group of continuous occurrences of 1's (0's). Afterwards, the average power value x of samples within each window is calculated at 210 and used at 212 to find the Gaussian component k yielding the highest responsibility for the average $$\operatorname*{argmax}_{k} r_k(x) \quad (4)$$

where $$r_k(x) = \frac{\mathcal{N}(x \mid \mu_k, \sigma_k)}{\sum_{i=1}^{M+1} \mathcal{N}(x \mid \mu_i, \sigma_i)} \quad (5)$$

Consistent with the definition of terms in eq. (2), $\mu_k$ and $\sigma_k$ are the mean and standard deviation of the Gaussian component k, respectively, rk(x) is the responsibility function, which is a direct derivation from Bayes theorem. Consequently, an average x can be assigned to bin k if $$x \in \left[\mu_k - \frac{s}{2}, \mu_k + \frac{s}{2}\right].$$

A record is saved in memory/storage at 214 for each of the activity/inactivity window 208 comprising the index of the Gaussian component with the highest responsibility and also the count of samples in that window 208. A PESA example is detailed in the pseudo-code labeled "Algorithm 1" below. In representative examples, the bin widths of the dynamic range are equal in units of dBm. In additional examples, bin widths can have different values. As shown in FIG. 2C, the method 250 can include, at 252, providing RF power bin ranges and time domain samples for processing and compression. In representative examples, the RF power bins have ranges defined by splitting a dynamic range of monitoring equipment used to collect the time domain samples into a plurality of contiguous ranges spanning the dynamic range or a portion of the dynamic range. Each power bin can be assigned or associated with a model component, such as Gaussian components of a Gaussian mixture model. In some examples, other mixture models and associated component distributions can be used (e.g., uniform, log-normal, super-Gaussian, Cauchy, t-distribution, logistic, pareto, etc.), and different distributions can be used for different bins (e.g., a selected distribution associated with a noise bin and a selected distribution for each power bin, different distributions between two or more power bins, etc.). At 254, an activity window is identified from the time domain samples as a sequence with each sample above a selected power threshold. At 256, the power average of the samples of the identified window is calculated. At 258, the power average can be compared to the power bins ranges and assigned to the power bin having the range that includes the power average. In a Gaussian mixture model, the assigned power bin can correspond to the bin having the largest Bayesian responsibility for the average. At 260, the length of the window (e.g., number of samples and sampling rate) and the assigned power bin can be stored in memory as compression data. At 262, if there are additional activity windows, the process can repeat at 254. Also, windows of inactivity can be stored as well, which generally correspond to the length of time (e.g., in samples) over which no samples above the power threshold at 254 are observed. At 264, the compressed time domain data file can be output and stored.

Figure 3:
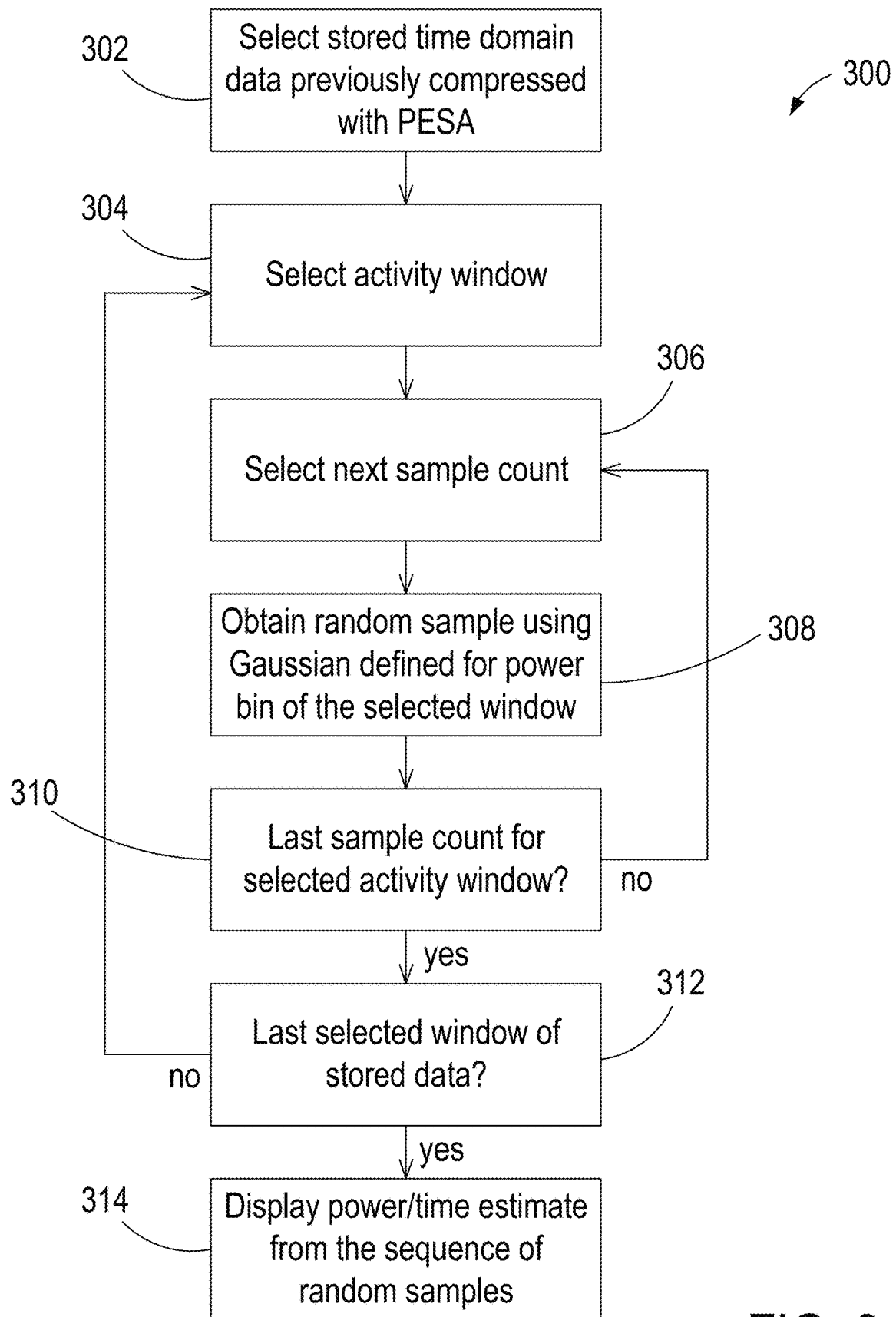
FIG. 3 is a flowchart of an estimation method using PESA compressed data.

Referring to FIG. 3, an example estimation method 300 shows how saved records and the model G can be used to generate an estimate of observed values by sequentially drawing random samples—per each saved record—from a Gaussian distribution that has the mean and standard deviation values indicated in the record. Thus, at 302, stored time domain data that has been previously compressed is selected. At 304, an activity (or inactivity) window is selected. For the selected activity window, the first sample count is selected at 306, and at 308 a random sample is drawn using the Gaussian distribution with the predetermined mean and standard deviation. At 310, if there are additional sample counts in the selected activity window, the process of drawing random samples at 308 can be repeated for the remaining sample counts of the selected activity window. If not, at 312, if there is a new activity window that can be selected the process can repeat at 304. In some examples, the reconstructed estimate corresponding to the original detected time domain measurements can be displayed at 314. Thus, in representative examples, PESA implementations can include estimation of the Gaussian component that best describes each activity/inactivity window, storage of indicators to Gaussian components coupled with corresponding sample counts, and/or generation of power samples using the stored indicators. Reconstructed estimates using the generated power values can be used to calculate CU and plot distributions of activity/inactivity periods. The power resolution (i.e., bin width) s controls that power range within which observations will be grouped and then regenerated. Analogous to s is RBW in frequency-domain measurements. Hereafter, CU is denoted as Φ and calculated on an example integration time of 1 s.

| Algorithm 1 Probabilistic Efficient Storage Algorithm (PESA) |
|---|
| 1:    $a \leftarrow DR_{min}$ {minimum value of dynamic range} |
| 2:    $b \leftarrow DR_{max}$ {maximum value of dynamic range} |
| 3:    $s \leftarrow$ Bin width {standard deviation of Gaussian components} |
| 4:    $(\mu_N, \sigma_N) \leftarrow$ noise mean and standard deviation |
| 5:    $T \leftarrow \mu_N + 3$ {activity decision threshold} |
| 6:    if $\mathrm{mod}\left(\frac{b-a}{s}, 1\right) = 0$ then |
| 7:      $M \leftarrow \left\lceil \frac{b-a}{s} \right\rceil + 1$ {number of Gaussian components in DR} |
| 8:    else |
| 9:      $M \leftarrow \left\lceil \frac{b-a}{s} \right\rceil$ {number of Gaussian components in DR} |
| 10:   end if |
| 11:   $G \leftarrow \frac{1}{M+1}\left[\sum_{i=0}^{M-1} \mathcal{N}(a + i \times s, s) + \mathcal{N}(\mu_N, \sigma_N)\right]$ |
| 12:   while processing queue is not empty do |
| 13:      $\mathcal{F} \leftarrow (f_1, f_2, \ldots, f_m)$ {next frame of power measurements data} |
| 14:      $B \leftarrow (\beta_1, \beta_2, \ldots, \beta_m) : \beta_j = \begin{cases} 1 & f_j > T \\ 0 & f_j \leq T \end{cases}$ |
| 15:      $\mathcal{W} \leftarrow [w_1, w_2, \ldots, w_n] : w_j$ is the $j^{th}$ group of elements from $\mathcal{F}$ who's corresponding elements B are continuous 1's or 0's |
| 16:      for all $w \in \mathcal{W}$ do |
| 17:        $l \leftarrow$ length(w) |
| 18:        $x \leftarrow \mathbb{E}(w)$ |
| 19:        $k \leftarrow \mathrm{argmax}\, r_k(x)$ |
| 20:        output $(l, \overset{k}{})$ |
| 21:      end for |
| 22:   end while |

Performance and Validation

The performance of PESA examples were validated using a group of spectrum occupancy laboratory tests, each lasting 60 s with varying levels of CU. Wireless activity was generated using IEEE 802.11n network comprising an access point (AP) and a station (STA), where user datagram protocol (UDP) packets where transmitted from STA to AP on channel 6 ($f_c$=2437 MHz). This type of network was selected for its ability to generate a wide range of CU values by controlling the wireless link throughput, where higher values of throughput result in elevated CU. STA was placed 2 m away from AP in an indoor environment and operated on a single transmission chain. One of thirteen throughput values were selected for each test, ranging from 1 Mbps (corresponds to Φ≈2%) to the maximum achievable value of ≈60 Mbps (corresponds to Φ≈90%). Given that CU is calculated using an integration time of 1 s, the validation dataset included 780 data points.

Figure 4A:
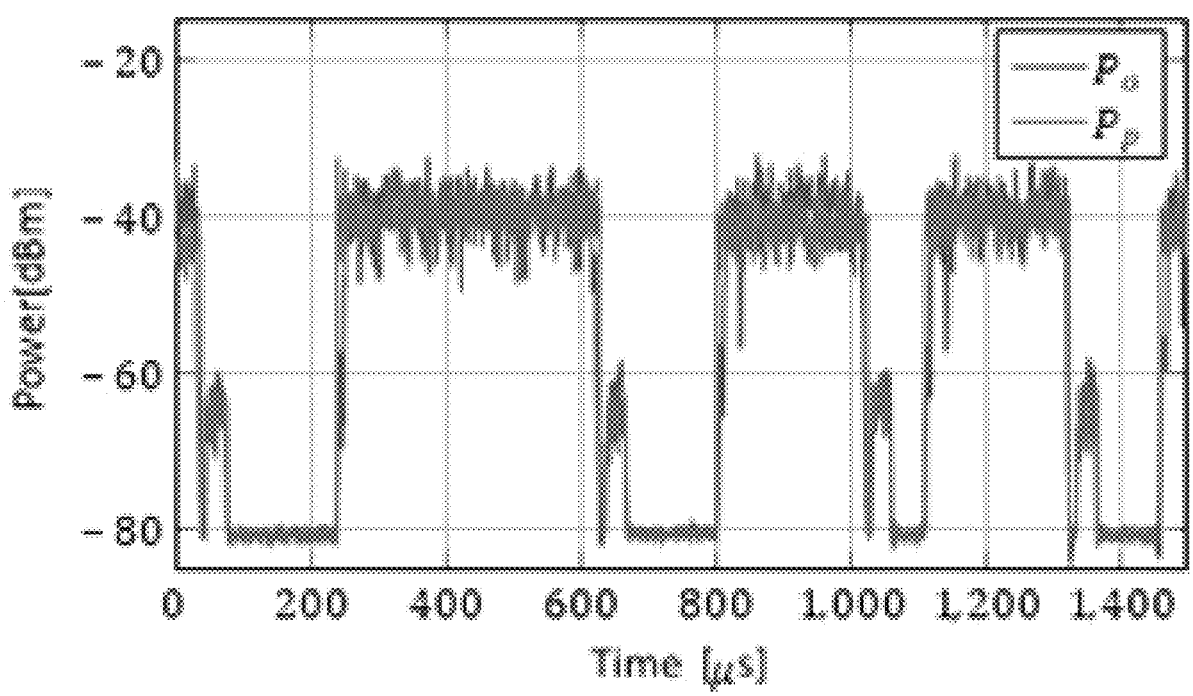
FIGS. 4A-4C are graphs with FIG. 4A comparing observed power samples ($P_o$) that substantially match those generated after using PESA for storage ($P_p$), and with FIGS. 4B and 4C showing the power samples ($P_o$) and generated samples ($P_p$), separately.
Figure 4B:
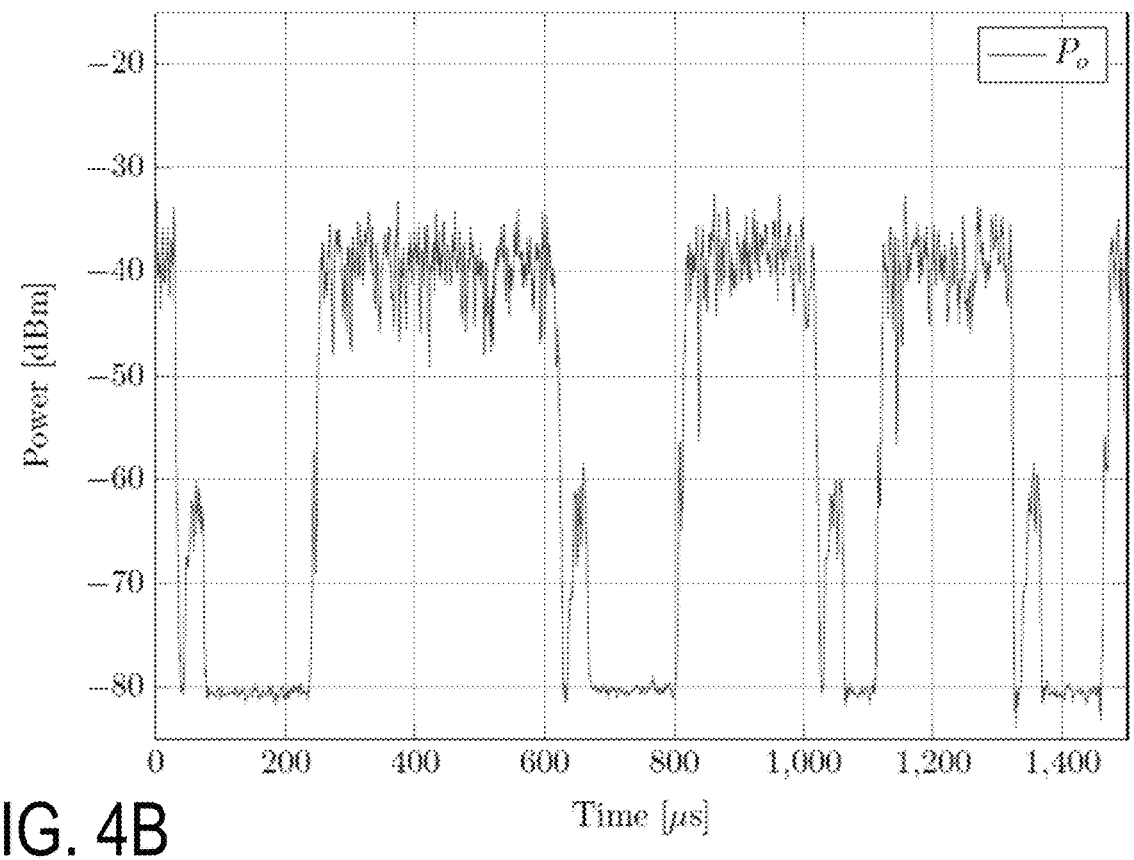
Figure 4C:
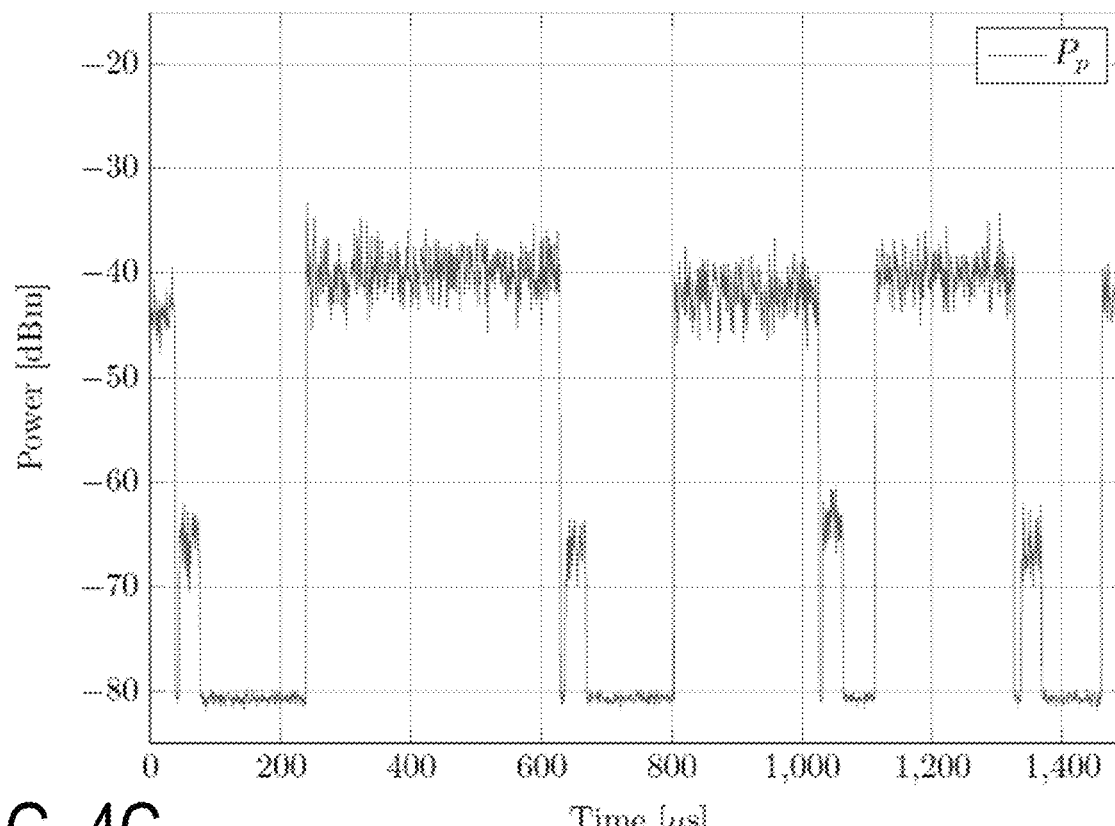

ME was based on National Instruments (NI) PXIe platform and placed close to STA to record received power measurements by leveraging a custom software. ME was tuned to the same center frequency as the Wi-Fi network (i.e., fc=2437 MHz) and configured with $1 \times 10^6$ sample/s I/Q sampling rate. Consequently, time resolution was 1 µs. A moving-average smoothing filter of 3 samples length (i.e., a low-pass filter with coefficients equal to ⅓) was applied to reduce the fluctuations of power measurements. FIG. 4 illustrates a comparison between the source observed power measurements (hereafter referred to with the subscript $_o$) and those generated from PESA stored data (hereafter referred to with the subscript $_p$) for the same observation period. It is evident that $P_p$ closely matches $P_o$ and maintains the widths of activity and inactivity periods. This outcome facilitates accurate calculation of CU and the distributions of activity/inactivity periods.

A. Storage

Figure 5:
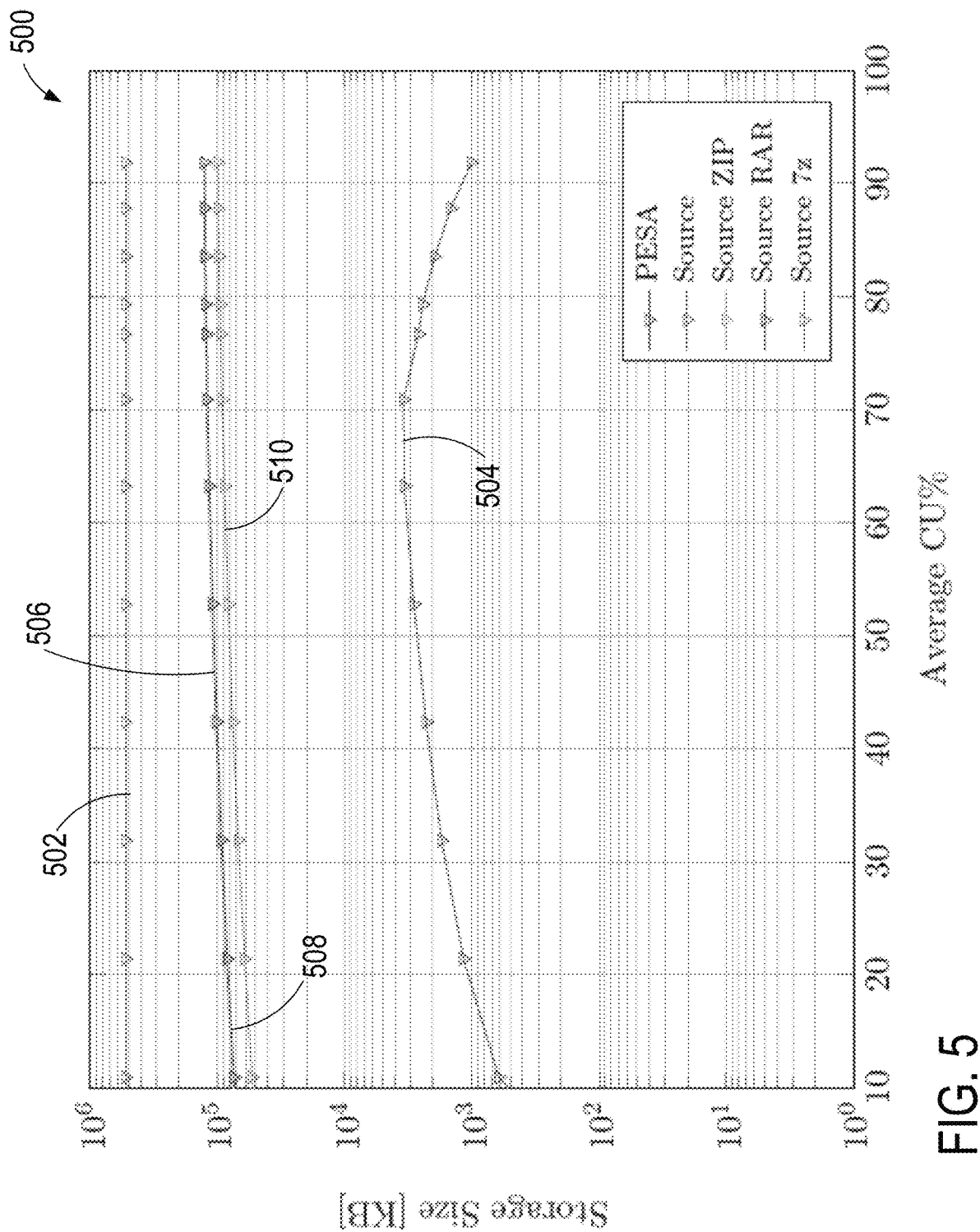
FIG. 5 is a comparison of the storage size of the source CSV files storing the power samples observed by ME and those storing PESA outputs. Additionally, the size of lossless compressed versions of the source data using ZIP, RAR, and 7z archives is plotted, illustrating how PESA can outperform other methods by reducing the required storage for time-domain spectrum measurements.

FIG. 5 shows a graph 500 of a comparison of disk storage volume required for the source recording (i.e., $P_o$ samples) 502 and PESA outputs 504 for a given test on each data point, with text files containing comma-separated values (CSV) being used for both. Furthermore, compressed versions of the source data using mainstream lossless formats such as ZIP 506, RAR 508, and 7z 510 archives, were also generated and shown for comparison. Compression with ZIP 506 and RAR 508 are approximately overlapping in FIG. 5. These formats were configured to achieve the maximum possible compression when the dictionary size of the ZIP archive was 32 Kilobytes, and that of the RAR and 7z archives was 32 Megabytes. The graph 500 of the comparison shows that all CSV files that stored the observed measurements had approximately the same size (i.e., 0.5 gigabytes). This stems from the constant sampling rate and observation period, resulting in about $60 \times 10^6$ samples stored in each file. In representative examples, PESA stores only the count of samples in each activity or inactivity window, in addition to the value of k as a pointer to the corresponding Gaussian component in eq. (2). On average, 99.64% reduction in storage volume was achieved using a PESA implementation. When 802.11n network was set to operate at a low throughput resulting in low Φ, few frames were transmitted to achieve the requested value. Consequently, the count of PESA records was low, which reflects on the size of resulting PESA CSV output. The size increased with the requested throughput (and accordingly Φ) until the frame aggregation feature of 802.11n began to be leveraged. In this case, the network transmitted longer frames to achieve efficient CU for higher throughput. This resulted in fewer PESA records, explaining the decrease in PESA output size observed on the high end of Φ values. In comparison, the average reduction in storage volume achieved by the ZIP, RAR, and 7z formats was 79.5%, 79.98%, and 84.69%, respectively.

B. CU Accuracy

Figure 6A:
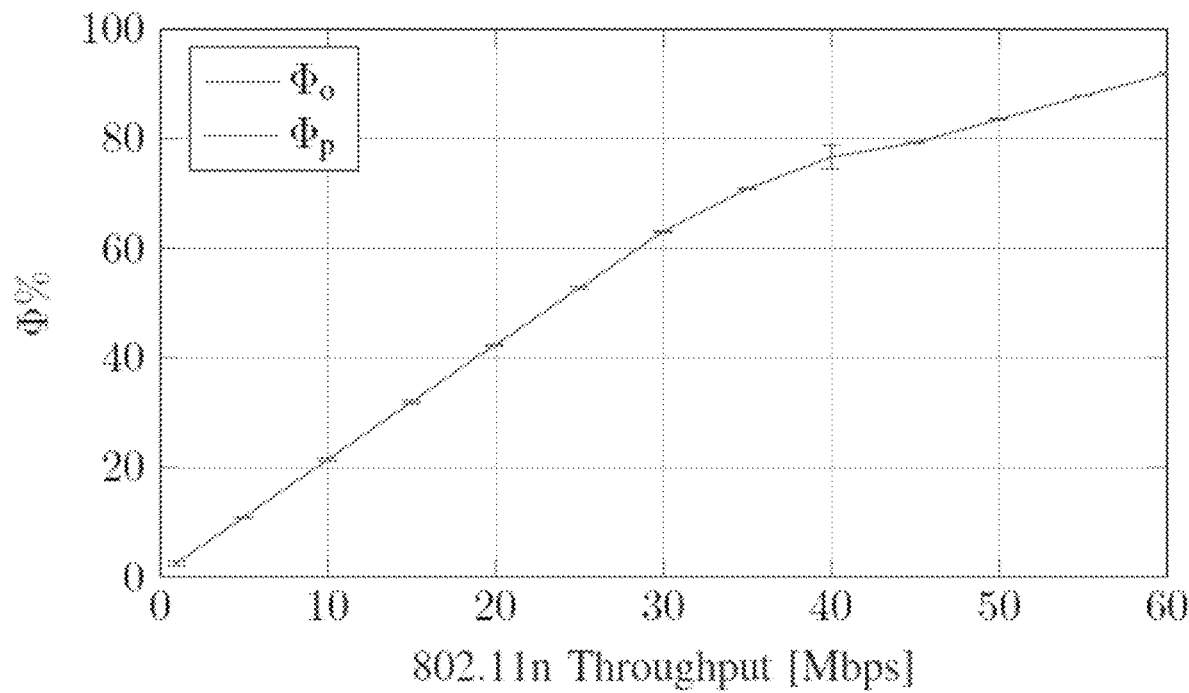
FIG. 6A is comparison of channel utilization (CU) values estimated using observed and PESA-generated data. IEEE 802.11n system was used at various throughput values to generate CU covering a wide range of possible values. The illustrated error bars are centered at the mean value of CU and the length is the standard deviation.
Figure 6B:
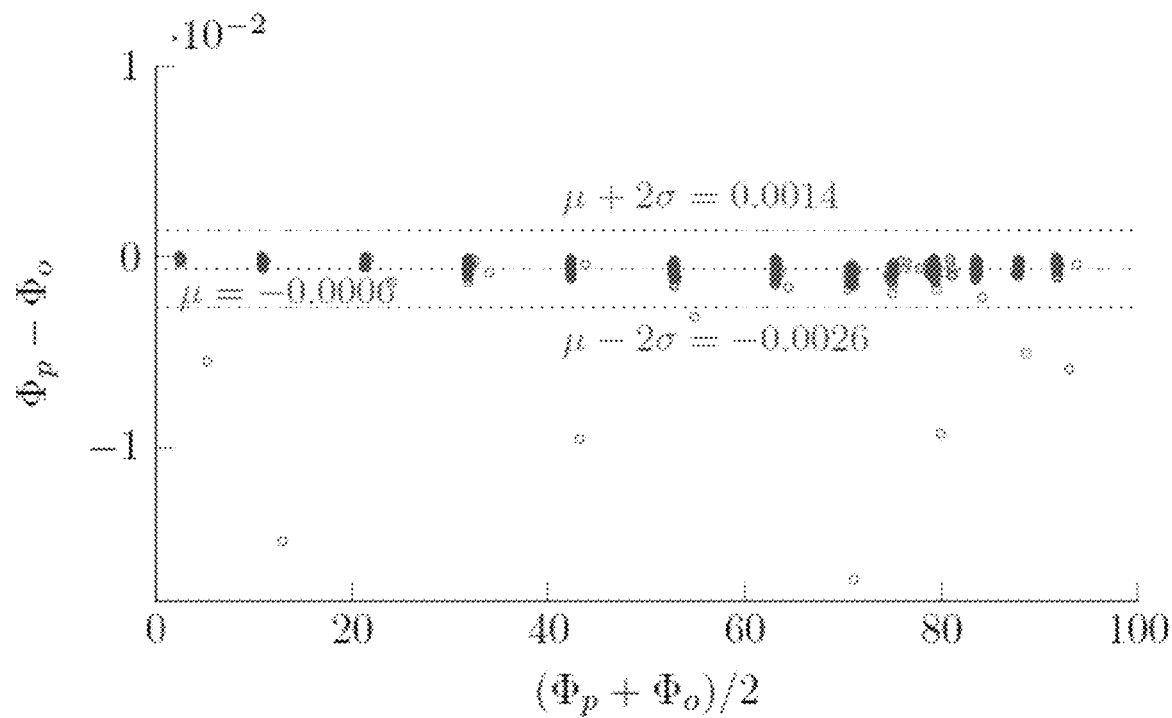
FIG. 6B is a Bland-Altman graph comparing estimated CU and actual CU.

The performance of PESA in facilitating accurate CU estimation is depicted in FIGS. 6A-6B. A comparison of CU values estimated using the observed samples ($\Phi_o$) and those generated by PESA ($\Phi_p$) is illustrated on FIG. 6A using error bars. Each bar represents the measurement population at a given network throughput, where the center is the mean value and the length is the standard deviation. Notably, the match between the two curves offers a visual confirmation that both methods lead to almost identical results. To further confirm this observation, the two-sample Kolmogorov-Smirnov test was used. Results indicated that for each examined population of measurements the test failed to reject the null hypothesis that the CU estimates derived from observed data and PESA, respectively, are from the same distribution.

FIG. 6B illustrates a Bland-Altman plot, which compares $\Phi_o$ and $\Phi_p$ by means of a scatter-plot between the difference ($\Phi p - \Phi o$) as a function of the average estimate of both methods. The bias does not increase or decrease proportionally to the average, i.e., using PESA data can allow accurate CU estimation across the entire range of possible values with no visible degradation in performance for any given range. The mean error is $E[\Phi p - \Phi o] = -0.0006$ and the standard deviation of the error is 0.001. Accordingly, the 95% limits of agreement for a CU value estimated using PESA data when compared to using the observed power samples are (−0.0026, 0.0014). Consequently, using representative PESA examples to store and regenerate spectrum measurements can allow for highly accurate CU estimation, and only adds limited uncertainty to that identified in eq. (1). This is achievable at a fraction of the required storage volume.

C. Distribution of Active/Inactive Periods

Figure 7A:
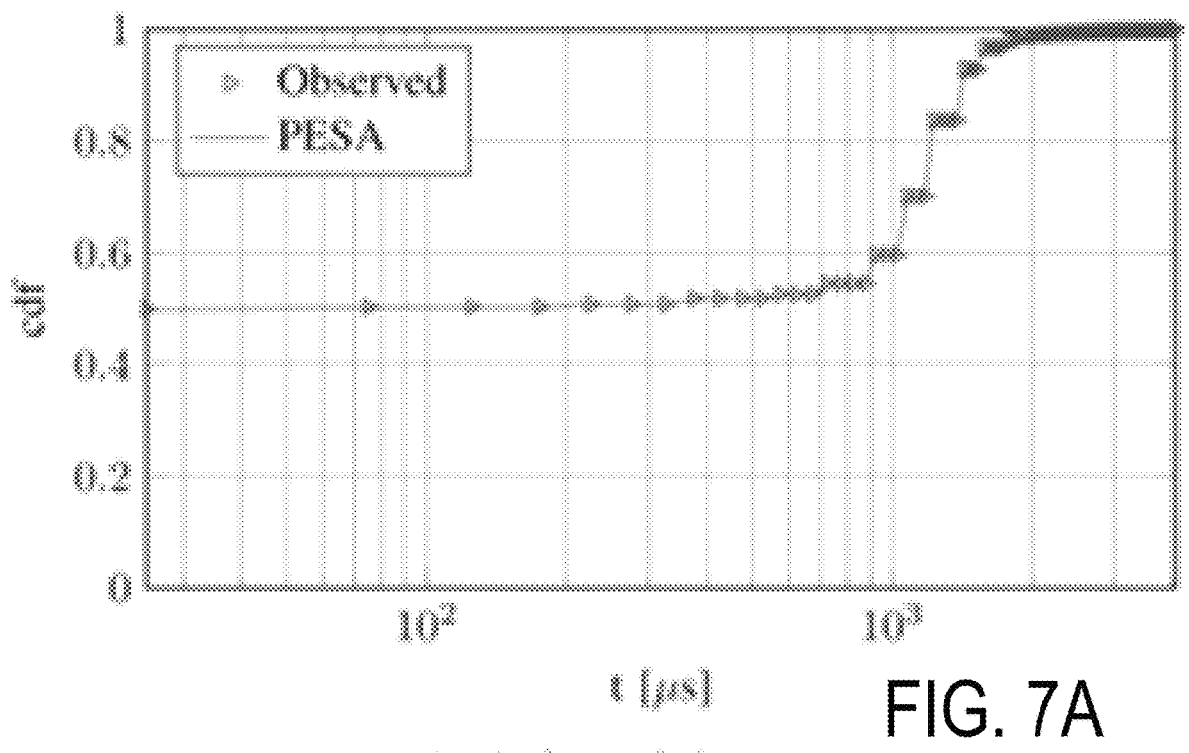
FIGS. 7A-7B are graphs of cumulative distribution functions for active and inactive periods, respectively.
Figure 7B:
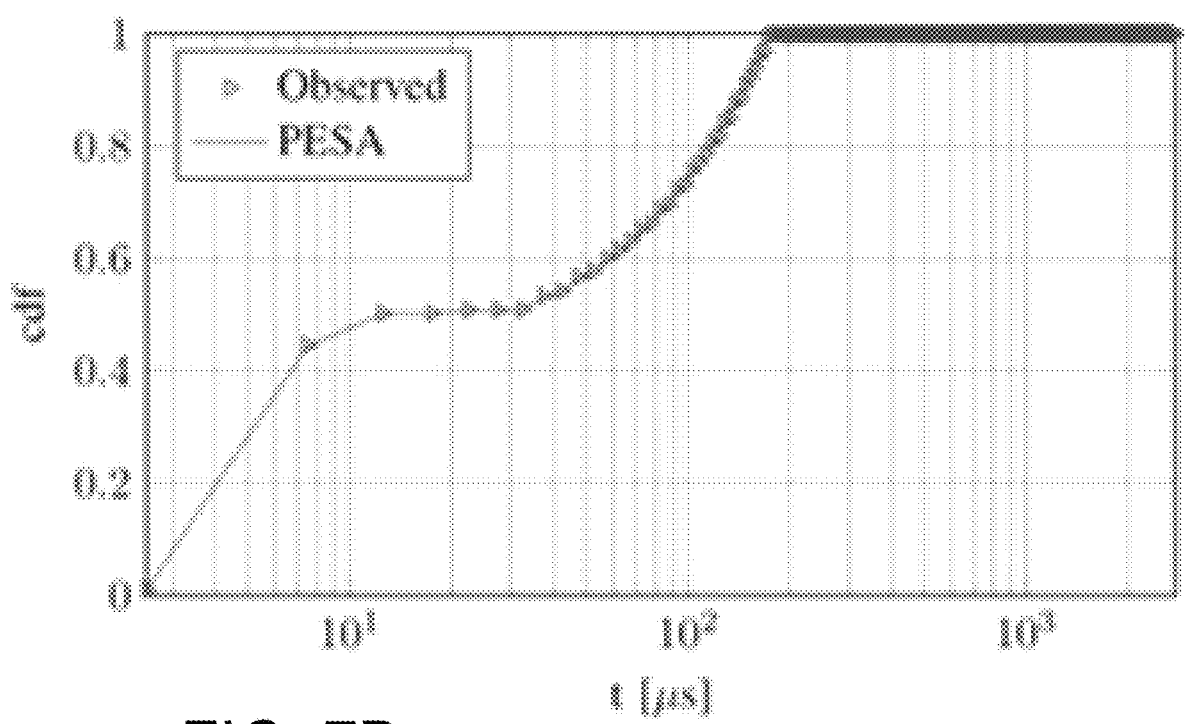

Accurate representation of active/inactive periods is a useful outcome of time-domain spectrum surveys that can help optimize the operational parameters (e.g., packet length) of coexisting technologies. FIGS. 7A-7B details the cumulative distribution function (CDF) of active (FIG. 7A) and inactive (FIG. 7B) periods that were observed when the IEEE 802.11n network operated at the maximum achievable throughput. It can be observed that almost half of the detected inactivity periods were equal to the short inter-frame spacing (SIFS=10 μs) that precedes the transmission of acknowledgment messages. The gradual increase in the inactive periods CDF begins after the value of minimum contention window and corresponds to the exponential back-off used by the distributed coordination function (DCF) of the 802.11 standard. As for the active periods, the step-like increase of the CDF curve reflects data frame aggregations. Spectrum measurements stored using PESA maintained accurate representation of active and inactive periods distributions. This can be seen on FIG. 7A and FIG. 7B through the close match of CDF curves derived using samples of the two storage methods. Furthermore, this is confirmed by the two-sample Kolmogorov-Smirnov test, where for both cases of activity and inactivity observations, the test did not find evidence that the signal temporal characteristics deduced from PESA stored data have a different distribution than those calculated using the source stored power samples.

Additional Implementations

Figure 8:
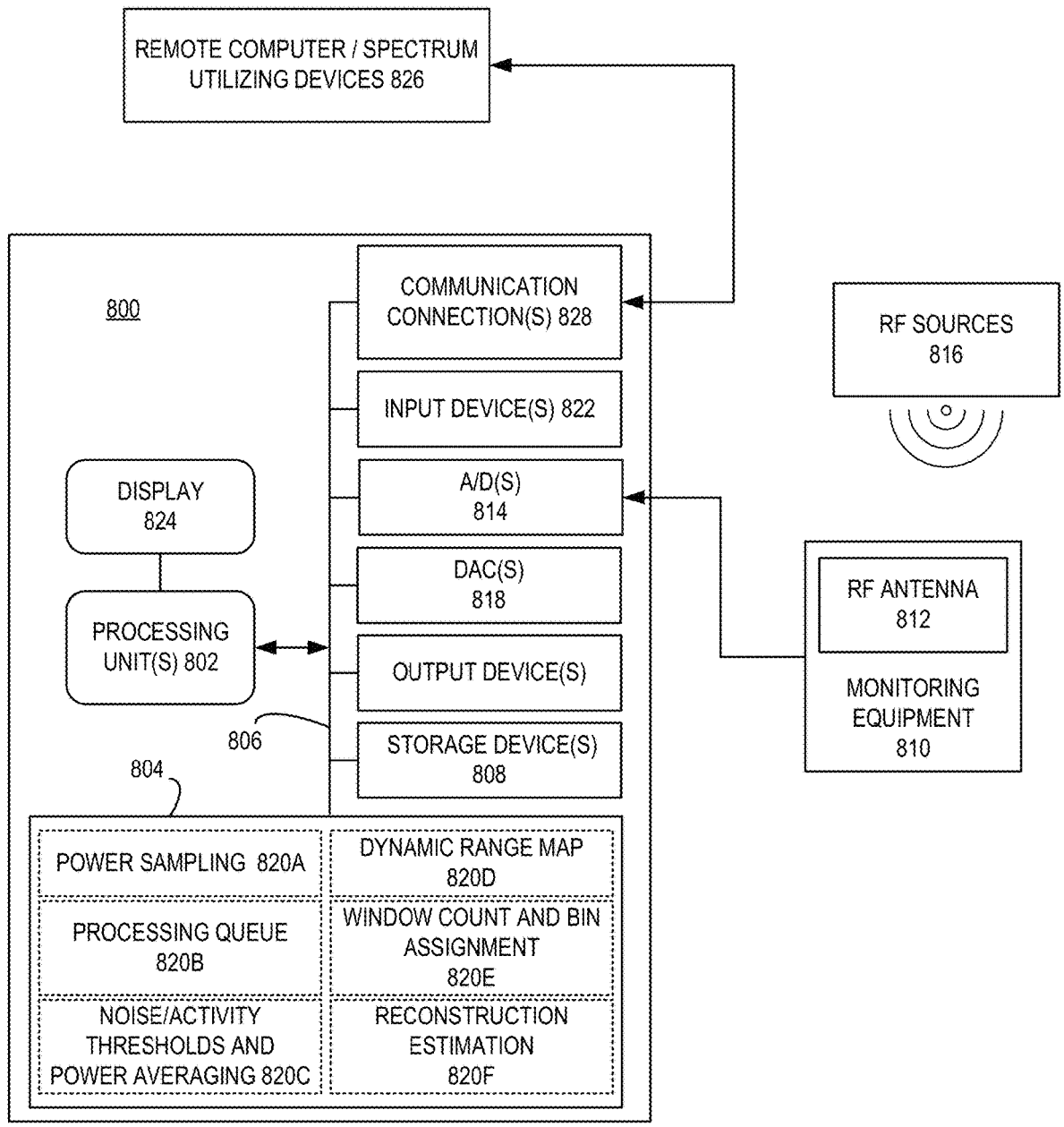
FIG. 8 is a schematic of a representative system implementing PESA.

FIG. 8 shows an example implementing PESA on a hardware platform, such as a computing device 800, to facilitate performing time-domain spectrum surveys in realistic environments. The platform was then deployed to conduct a survey in a healthcare environment with low spectrum utilization. In general, FIG. 8 and the following discussion are intended to provide a brief, general description of an exemplary computing environment in which the disclosed compression and/or decompression technology may be implemented. Although not required, the disclosed technology is described in the general context of computer-executable instructions, such as program modules, being executed by a computing unit, dedicated processor, or other digital processing system or programmable logic device. Generally, program modules include routines, programs, objects, components, data structures, etc., that perform particular tasks or implement particular abstract data types. Moreover, the disclosed technology may be implemented with other computer system configurations, including handheld devices, personal computers (PCs), multiprocessor systems, microprocessor-based or programmable consumer electronics, network PCs, minicomputers, mainframe computers, dedicated processors, MCUs, PLCs, ASICs, FPGAs, CPLDs, systems on a chip, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, an exemplary system for implementing the disclosed technology includes the computing device 800 that includes one or more processing units 802, a memory 804, and a system bus 806 that couples various system components including the system memory 804 to the one or more processing units 802. The system bus 806 may be any of several types of bus structures including a memory bus or memory controller, a peripheral bus, and a local bus using any of a variety of bus architectures. The memory 804 can include various types, including volatile memory (e.g., registers, cache, RAM), non-volatile memory (e.g., ROM, EEPROM, flash memory, etc.), or a combination of volatile and non-volatile memory. The memory 804 is generally accessible by the processing unit 802 and can store software in the form computer-executable instructions that can be executed by the one or more processing units 802 coupled to the memory 804. In some examples, processing units can be configured based on RISC or CSIC architectures, and can include one or more general purpose central processing units, application specific integrated circuits, graphics or co-processing units or other processors. In some examples, multiple core groupings of computing components can be distributed among system modules, and various modules of software can be implemented separately.

The computing device 800 can further include one or more storage devices 808 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 806 by a hard disk drive interface, a magnetic disk drive interface, and an optical drive interface, respectively. The drives and their associated computer-readable media provide nonvolatile storage of computer-readable instructions, data structures, program modules, and other data for the computing device 800. Other types of non-transitory computer-readable media which can store data that is accessible by a PC, such as magnetic cassettes, flash memory cards, digital video disks, CDs, DVDs, RAMs, ROMs, and the like, may also be used in the exemplary computing environment. The storage 808 can be removable or non-removable and can be used to store information in a non-transitory way and which can be accessed within the computing environment.

As shown in FIG. 8, the computing device 800 is coupled through one or more analog to digital convertors (A/Ds) 814 to an ME 810, such as a spectrum analyzer or software defined radio having an RF antenna 812. In some examples, the computing device 800 can be part of a spectrum analyzer or software defined radio. In some examples, the computing device 800 and ME 810 can comprise application specific hardware/software, such as a probabilistic storage and compression device, specifically configured for detection, compression, and storage of compressed data. During operation, the ME 810 detects time domain RF signals from RF sources 816 (e.g., WiFi sources), typically at a selected narrowband frequency, and sends the RF signals to the computing device 800 for conversion to time domain RF power measurements. The computing device 800 can include digital to analog converters (DACs) 818 are coupled to the bus 806, e.g., for control of external analog devices.

To facilitate the implementation of PESA on a hardware platform, the spectrum survey software examples discussed hereinabove were leveraged as a foundation. The software, e.g., stored in the memory 804 at 820A, can automate the acquisition of I/Q measurements at a pre-configured sampling rate and the calculation and storage of corresponding received power samples. The software was extended to include a PESA real time processing queue 820B that handles temporary storage of the stream of observed power samples. Processes for thresholding and active/inactive window identification were also implemented in 820C to allow for calculating the mean power value and number of samples for each established window. The dynamic range of the ME 810 can be mapped and stored in a dynamic range map 820D. A window is assigned to a given GMM component in 820E (splitting or dividing the dynamic range of the ME based on the dynamic range map 820D) by evaluating the mean value according the component's mean and standard deviation. Evaluation can be assisted by comparing determined window power averages with look-up tables associating the dynamic range map 820D and GMM component characteristics. Accordingly, the software permits the storage of PESA outputs in text format in the memory 804 and/or storage devices 808 while the capability to store the pre-processed source power observations is maintained but made optional. Furthermore, the software can establish and report the CU error estimation to aid the user in deciding whether to store or omit the source data. For example, to determine channel utilization from observed power samples, the power measurements can be stored for a selected integration time (e.g., 0.1 s, 1 s, 10 s, etc.), measurements can be compared with a selected activity decision threshold T with measurements exceeding the threshold T being indicated by 1's and measurements at or below the threshold being indicated by 0's, and a channel utilization can be calculated as the sum of 1's in the integration time divided by the count of power measurements. To determine channel utilization from PESA regenerated power samples, estimates of power samples can be generated in accordance with the examples discussed above and the regenerated power samples stored temporarily over a selected integration time, regenerated measurements can be compared with a selected activity decision threshold T with measurements exceeding the threshold T being indicated by 1's and measurements at or below the threshold being indicated by 0's, and a channel utilization can be calculated as the sum of 1's in the integration time divided by the count of the regenerated power measurements. With the two channel utilization estimates available, an error can be determined through the differences.

Selected examples of software were developed in LabVIEW and operated on National Instruments (NI) vector signal transceiver (VST) PXIe-5644R platform. The VST has an average noise level of 157 dBm/Hz, 80 dB spurious-free dynamic range, and 50 MHz instantaneous bandwidth. The low complexity and flexibility of PESA allows the developed software to be ported to other platforms capable of running LabVIEW code (e.g., vector signal analyzer (VSA) and universal software radio peripheral (USRP)) with little to no changes. However, using another hardware platform should account for any changes in the aggregated gain and offset applied to the RF signal. Estimates corresponding to the detected RF signals can be reconstructed in the memory 820F by using drawing random samples from a Gaussian distribution corresponding to the bin mean and standard deviation assigned to each recorded activity/inactivity window.

In addition to the above, a number of program modules (or data) may be stored in the storage devices 808 including an operating system, one or more application programs, other program modules, and program data. A user may enter commands and information into the computing device 800 through one or more input devices 822 such as a keyboard and a pointing device such as a mouse. Other input devices may include a digital camera, microphone, satellite dish, scanner, display, or the like. These and other input devices are often connected to the one or more processing units 802 through a serial port interface that is coupled to the system bus 806, but may be connected by other interfaces such as a parallel port or universal serial bus (USB). A display 824 such as a monitor or other type of display device can also be connected to the system bus 806 via an interface, such as a video adapter. Some or all data and instructions can be communicated with a remote computer 826 through communication connections 828 (e.g., wired, wireless, etc.) if desired, though wireless communications can be limited during surveying to avoid possible interference. In some examples, the remote devices 826 can include one or more devices that broadcast and/or receive in the RF spectrum and that can use the compressed and/or decompressed usage data for channel utilization.

In a particular example, the software and hardware system of FIG. 8 implementing PESA were deployed at the University of Oklahoma Family Medicine Center in Tulsa, Okla., USA to perform a time-domain spectrum survey. The environment was a clinic that offers healthcare services to the local community. One location in the environment was surveyed by installing the equipment in a hallway while noting that the separation distance between the ME antenna and the closest Wi-Fi AP is approximately 1.5 meters. Other APs in the environment were active at further separation distances from ME. To estimate the activity decision threshold, a prescan was conducted and noise power samples were collected and fitted into a Gaussian distribution. The activity threshold was then fixed at 106 above the noise mean (i.e., −74.6 dBm) to minimize the false detection error generated by identifying the noise samples as active. ME was tuned to the center frequency of Wi-Fi channel 1 centered on 2412 MHz and I/Q sampling rate was set to $1 \times 10^6$ samples/s. A smoothing filter with 3-sample length was used to reduce measurement fluctuations. The survey lasted 7 hours, on Dec. 1, 2017 10:16 AM-5:16 PM and resulting in more than 25 billion observed power samples. As this survey was meant as a demonstration for PESA capabilities, both observed power samples and PESA output were saved in CSV files. The former required approximately 8.4 gigabytes for storage and the latter 96.28 megabytes—98.85% decrease in storage volume.

Figure 9A:
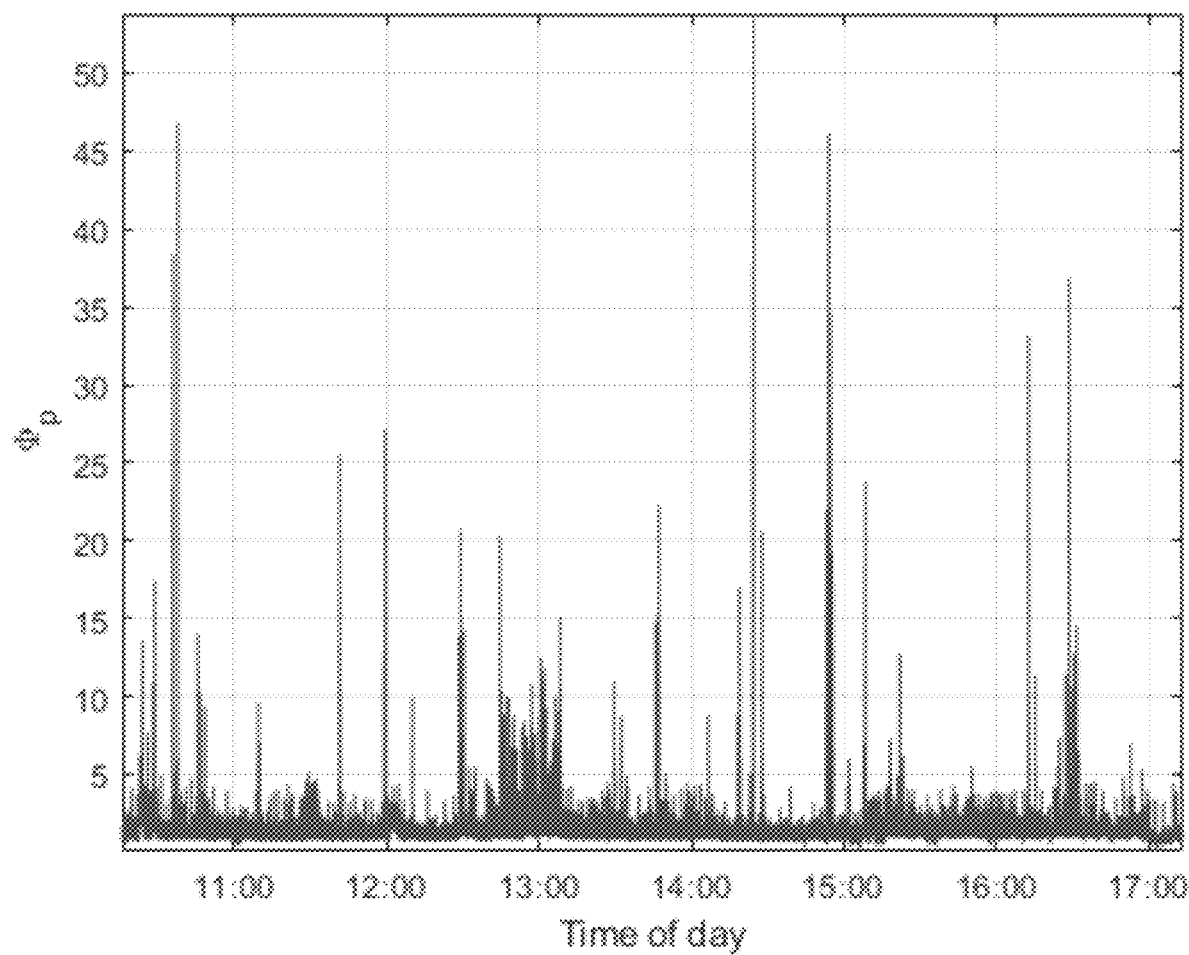
FIG. 9A is a graph showing observations of CU in the environment.
Figure 9B:
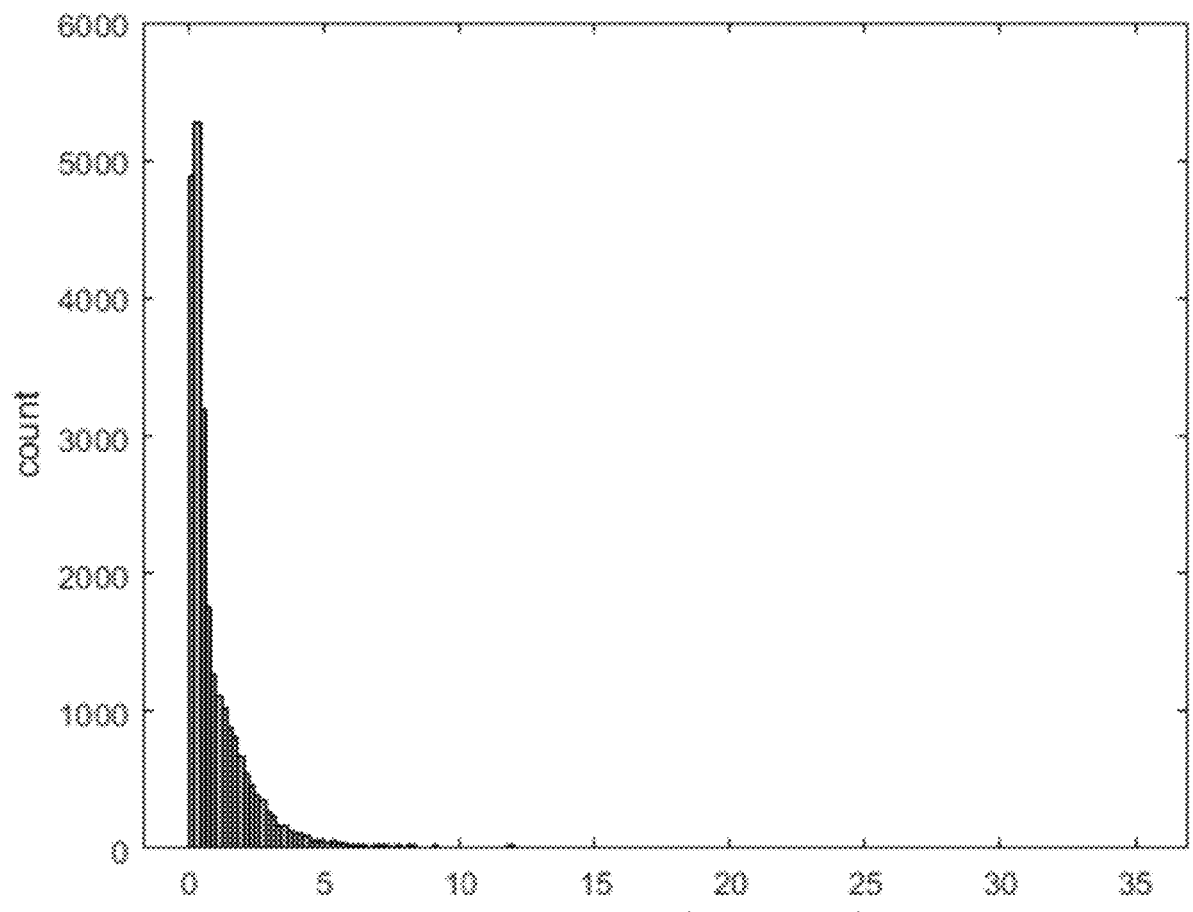
FIG. 9B is a histogram of error between $\Phi_o$ and $\Phi_p$.

The PESA output was used to generate power samples in a reconstructed estimate, as detailed above. CU was then calculated based on 1 s integration time. FIG. 9A plots CU variations during the survey period. CU values remained close to 1% for most of the observation period with sporadic occurrences of high values. The maximum CU was 53.83%. For clarity, only $\Phi_p$ values are displayed on FIG. 9A as they closely match $\Phi_o$. When compared with CU estimates using the observed power measurements, the error was approximately 1.2%. This can be seen in FIG. 9B where the histogram of the error between $\Phi_o$ and $\Phi_p$ is illustrated, i.e., $$E = 100 \times \frac{|\Phi_o - \Phi_p|}{\Phi_o}.$$

The overall low CU can be attributed to the low density of users with wireless equipment during the survey. Notably, single-location spectrum surveys can be specifically or exclusively sensitive to wireless activities in the vicinity of the measuring equipment. An alternative approach can deploy a distributed network of spectrum sensors (such as shown in FIG. 1) to obtain a representative image of the wireless channel activities over an extended set of locations in the environment. However, this or similar surveys of intended use environments of a wireless device can be used in tandem with wireless coexistence testing results to estimate the likelihood of successful coexistence when the device is used in realistic scenarios. Such effort can inform the design of wireless devices with critical functions like medical devices and help complement the wireless performance testing and reporting of the device.

Thus, examples of low-complexity probabilistic efficient storage algorithms are disclosed that can facilitate the storage and analysis of time-domain spectrum measurements. The algorithms can maintain high quality estimation of channel utilization by efficiently capturing a large number of samples that are included in the CU calculation. Furthermore, temporal characteristics of spectrum occupancy are preserved in terms of distributions of active/inactive time periods, including while achieving on average 99.64% reduction in required data storage volume. Examples of the disclosed methods can significantly facilitate the study of wireless coexistence by allowing the investigation of high-quality long-term spectrum surveys of a given environment in addition to the interaction of coexisting technologies in a lab environment. Both are useful for wireless device manufacturers and researchers to enhance the device design and expand wireless coexistence testing outcomes. In a specific implementation, a LabVIEW code was developed for a real-time PESA implementation on an NI VST and a spectrum survey was conducted for 7 hours in a healthcare facility. The survey confirmed the findings of the validation study where the storage volume was reduced by 98.85% while maintaining an accurate estimation of the channel utilization.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

In accordance with the discussions above, the PESA algorithms described may be, for example, embodied as software or firmware instructions carried out by a digital computer. For instance, any of the disclosed PESA techniques can be performed by a computer or other computing hardware (e.g., an ASIC or FPGA) that is part of a RF spectrum analyzing system. The RF spectrum analyzing system can be connected to or otherwise in communication with the RF monitoring equipment and be programmed or configured to receive RF signals from the RF monitoring equipment (which can also be an integrated part of the RF spectrum analyzing system) so that corresponding RF power measurement compression and/or decompression computations can be performed (e.g., any of the PESA compression and/or decompression/estimation techniques disclosed herein). The computer can be a computer system comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed PESA techniques. The results of the computations or associated manipulations of compressed or decompressed data can be stored (e.g., in a suitable data structure) in the one or more tangible, non-transitory computer-readable storage media and/or can also be output to the user, for example, by displaying, on a display device, with a graphical user interface.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:
1. A method, comprising:
compressing a plurality of time domain samples with a processor and memory by:
providing the plurality time domain samples and a plurality of power bins;
identifying an activity window corresponding to a sequence of the time domain samples that are above a selected power threshold;
determining a power average for the activity window;
assigning the power average to one of the power bins having a range that includes the power average; and
storing the assigned power bin and number of time domain samples of the activity window.
2. The method of claim 1, further comprising:
splitting a dynamic range of a monitoring device into a plurality of ranges corresponding to the power bins and respectively assigning a model component to each power bin;
wherein the model components comprise Gaussian components of a Gaussian mixture model, and wherein the range that includes the power average corresponds to the range of the power bin having a largest Bayesian responsibility for the power average.
3. The method of claim 2, further comprising determining the largest Bayesian responsibility for the power average by determining an argmax of a Bayesian responsibility function.
4. The method of claim 2, further comprising detecting the plurality of time domain samples of radio frequency power with the monitoring device.
5. The method of claim 2, wherein the monitoring device is a spectrum analyzer, a software defined radio, or a probabilistic compression and storage device.
6. The method of claim 1, wherein the compressing the plurality of time domain samples includes:
identifying additional activity windows;
for each additional activity window, determining an additional power average and assigning the additional power average to one of the power bins having a range that includes the additional power average; and
storing the additional assigned power bin and activity window data.
7. The method of claim 6, wherein the assigning the additional power average is based on the largest respective Bayesian responsibility for the additional power average.
8. The method of claim 1, further comprising:
estimating a prior radio frequency power over time based on the stored assigned power bin and number of time domain samples of the activity window.
9. The method of claim 8, wherein the estimating includes, for the activity window, sequentially drawing random samples from a Gaussian distribution having a mean and standard deviation corresponding to a mean and standard deviation of the model component associated with the assigned power bin of the activity window.
10. The method of claim 8, wherein the estimation corresponds to a wireless transmission channel usage.
11. The method of claim 2, wherein the model components comprise a Gaussian mixture model and the Gaussian mixture model further comprises a noise power bin.
12. The method of claim 11, wherein the noise power bin has a noise power mean and the selected power threshold is a predetermined amount greater than the noise power mean.
13. The method of claim 1, further comprising identifying an inactivity window corresponding to a plurality of time domain samples below the selected power threshold.

14. The method of claim 1, wherein each power bin has a power observation bin width defining, for the respective model component, a Gaussian component of a Gaussian mixture model with the Gaussian component having a mean at a center of the bin width and a standard deviation equal to the bin width.

15. The method of claim 1, wherein the time domain samples correspond to a specific frequency band over a selected observation period.

16. The method of claim 1, wherein the time domain samples include to sampling over multiple frequency bands over a selected observation period.

17. The method of claim 1, wherein the compressed plurality of time domain samples comprises a plurality of activity windows and inactivity windows.

18. A method, comprising:
   selecting stored compressed power window data comprising an activity window identifier and a power bin reference and window length associated with the activity window identifier, wherein the power bin reference designates one of a plurality of power bins that split a dynamic range of a monitoring device, with each power bin associated with a reconstruction model component; and
   estimating a radio frequency power over time from the selected compressed power window data based on the power bin reference and the window length.

19. The method of claim 18, wherein the estimating includes sequentially drawing random samples from a Gaussian distribution having a mean and standard deviation corresponding to a mean and standard deviation of the reconstruction model component associated with the power bin designated by the power bin reference.

20. The method of claim 19, wherein the estimating includes adding the sequentially drawn random samples to sequentially drawn random noise samples.

* * * * *